(12) United States Patent
Francesco et al.

(10) Patent No.: US 11,948,386 B1
(45) Date of Patent: Apr. 2, 2024

(54) ARTWORK AUTHENTICITY SYSTEMS AND METHODS

(71) Applicant: SPACEFARM LLC, New York, NY (US)

(72) Inventors: Rocchi Francesco, Ravenna (IT); Alberto Finadri, Castiglione Delle Stiviere (IT)

(73) Assignee: SpaceFarm LLC, New York, NY (US)

( * ) Notice: Subject to any disclaimer, the term of this patent is extended or adjusted under 35 U.S.C. 154(b) by 0 days.

(21) Appl. No.: 18/480,024

(22) Filed: Oct. 3, 2023

Related U.S. Application Data

(60) Provisional application No. 63/525,340, filed on Jul. 6, 2023.

(51) Int. Cl.
G06V 30/413 (2022.01)
G06V 30/42 (2022.01)

(52) U.S. Cl.
CPC ............ *G06V 30/42* (2022.01); *G06V 30/413* (2022.01)

(58) Field of Classification Search
None
See application file for complete search history.

(56) References Cited

U.S. PATENT DOCUMENTS

| | | | |
|---|---|---|---|
| 5,845,001 A | 12/1998 | Thomas | |
| 6,017,218 A | 1/2000 | Bright | |
| 8,930,302 B2 | 1/2015 | Scholzen | |
| 10,290,036 B1 * | 5/2019 | Gella | G06Q 30/0623 |
| 10,546,213 B2 | 1/2020 | Scholzen | |
| 2019/0385003 A1 | 12/2019 | Elgammal | |
| 2021/0374449 A1 | 12/2021 | McConnell et al. | |
| 2022/0122276 A1 | 4/2022 | Karam et al. | |
| 2022/0130159 A1 | 4/2022 | Le Henaff | |

(Continued)

FOREIGN PATENT DOCUMENTS

| | | |
|---|---|---|
| EP | 2 940 627 A1 | 11/2015 |
| WO | WO-01/82263 A1 | 11/2001 |
| WO | WO-2022/120008 | 6/2022 |

OTHER PUBLICATIONS

Albadarneh et al., "Machine Learning based Oil Painting Authentication an Features Extraction", Jan. 2017, https://www.researchgate.net/publication/346573516_%27Machine_Learning_based_Oil_Painting_Authentication_and_Features_Extraction.

(Continued)

*Primary Examiner* — Idowu O Osifade
(74) *Attorney, Agent, or Firm* — Foley & Lardner LLP

(57) ABSTRACT

Systems, devices, and methods are disclosed for generating an authenticity score for a creative work using digital image data of one or more creative works. A system receives, via a network, first digital image data of a first creative work. The system determines from the first digital image data, a first set of feature variables, each corresponding to a characteristic of the first creative work. The system determines, via an artificial intelligence model and with input including the first set of feature variables and a comparison dataset, an authenticity score for the first creative work. The artificial intelligence model generates, based on the portion of first feature variables of the first creative work that match corresponding portions of the comparison dataset, an output indicative of an authenticity score. The system communicates, via the network, an authenticity score of the first creative work to a client device.

22 Claims, 9 Drawing Sheets

(56) References Cited

U.S. PATENT DOCUMENTS

2023/0044309 A1\* 2/2023 Dodov .................. G06F 3/03
2023/0126839 A1\* 4/2023 Sarin .................. G06V 20/80
                                                    382/224

OTHER PUBLICATIONS

Karki et al., "A Novel Algorithm based on Contourlet Transform for Extracting Paint Features to Determine Drawing Style and Authorship", Mar. 2017, https://www.researchgate.net/publication/316835445_A_Novel_Algorithm_based_on_Contourlet_Transform_for_Extracting_Paint_Features_to_Determine_Drawing_Style_and_Authorship.

Kim et al., "Investigation of craquelure patterns in oil paintings using precise 3D morphological analysis for art authentication", https://www.researchgate.net/publication/362333733_Investigation_of_craquelure_patterns_in_oil_paintings_using_precise_3D_morphological_analysis_for_art_authentication.

Lyu et al., "A digital technique for art authentication", Jan. 2005, https://www.researchgate.net/publication/8162995_A_digital_technique_for_art_authentication.

\* cited by examiner

ARTWORK AUTHENTICITY SYSTEMS AND METHODS

RELATED APPLICATIONS

This application claims priority to U.S. Provisional Patent Application No. 63/525,340, filed Jul. 6, 2023, the entire contents of which are incorporated herein by reference.

TECHNICAL FIELD

The present disclosure relates generally to ascertain artwork authenticity based on at least digital image data of the artwork and, more specifically, to systems and methods that can generate an indication of authenticity of a creative work using artificial intelligence models and digital image data of a creative work.

INTRODUCTION

Some of the most valuable assets in the world are paintings and other creative works. As a result, creative works are often the subject of unauthorized reproductions, elaborate forgeries, or one or more, potentially high-quality, counterfeit copies. Accordingly, before a proposed sale of a valuable creative work, the authenticity of that creative work is very often verified (or evaluated), which may be performed, for example, by an expert in art history and/or artwork authenticity. Experts in creative work authenticity are highly specialized and possess a skillset that requires many years of experience to develop. As a result, the cost associated with an expert analysis can prohibitively high for a majority of creative works on the market today, which possess substantial values and the corresponding risk of purchasing a forgery. For example, many creative works may have sufficient value to create a need to verify the works' authenticity but that value may also be insufficient to justify the cost of an expert analysis. For example, for the vast majority of creative works currently on the market, the cost of an expert analysis is more than the entire value of the creative work. Nevertheless, the creative works worth less than the cost of a typical expert analysis may include many creative works worth substantial amounts (e.g., several tens of thousands of dollars).

Expert analysis may be inadequate in some instances, or may otherwise fall short. Experts are inevitably human and their work (or opinions) can be fallible. For example, as the potential value of a creative work increases, there can be greater tendency (or tension) that human factors come into play, such as relying on motivating factors (e.g., external influence, internal/external motivations) succumbing to prejudice, preference, bias, etc. And there is always a possibility that an expert can simply be wrong. While skill and experience can help to mitigate the human factor, additional methodologies and input for verifying, validating, and/or authenticating are desirable.

Another situation where expert analysis may fall short is when information is lacking, or where time constraints or cost considerations prevent obtaining all information. Consider that the traceability of the location and/or ownership through the years may be unavailable. Lack of information can thwart even the most skilled and/or experienced expert.

Presently available technology to supplement, complement, or supplant expert analysis is presently prohibitively expensive. Sophisticated machines and processes provide additional information as to authenticity, but at a cost that generally is only justifiable for the most expensive of creative works (e.g., greater than USD $250,000, or in some cases greater than USD $500,000).

Accordingly, there is a need for technology to verify an authenticity of many creative works more effectively and efficiently (e.g., at a cost that is lower than an average cost of an expert analysis (appraisal)) and/or that can verify an authenticity of a creative work with sufficient confidence for use in authenticating creative works worth many thousands of dollars.

SUMMARY

The present disclosure provides at least a technical solution that is directed to the authentication of creative works (e.g., paintings, drawings, sculptures, etc.), including verification of the author (e.g., contributing artists) of a creative work based on an image dataset that depicts the creative work to be authenticated and a comparison dataset that is based on image data for a plurality of separate creative works.

At least one aspect is directed to a method for verifying an artwork's authenticity. The method can include receiving, via a network, a first digital image data and a first metadata, wherein the first digital image data captures a first creative work at a first distance and the first metadata indicates an output resolution of the first digital image data and an originality of the first digital image data. The method can include determining, by one or more processors, an expected pixels per inch of the first digital image data, which is based on the output resolution of the first metadata and the first distance. The method can include determining, by the one or more processors, an actual pixels per inch of the digital image data based on a digital image resolution of the first digital image data and a dimension of the first creative work. The method can also include verifying, by the one or more processors, the first distance of the first digital image data based on a difference between the expected pixels per inch for the first digital image data and the actual pixels per inch.

The method can also include generating, by the one or more processors and based on the first digital image data, a plurality of different digital image data packs (e.g., by organizing the first digital image data into one or more digital image data groups, digital image data classifications, digital image data subsets, etc.). The method can include determining one or more feature variables of the first creative work based on one or more datasets extracted from a corresponding digital image data pack of the plurality of digital image data packs, each of the one or more feature variables corresponding to a characteristic of the first creative work. Additionally, the method can include determining an authenticity (e.g., an authenticity confidence level, an authenticity score) for the first creative work based on at least a comparison of the one or more feature variables of the first creative work and a comparison dataset based on a plurality of separate creative works and displaying, at a client device, the determined authenticity of the first creative work.

At least one aspect is directed to a system. The system can include one or more processors coupled to non-transitory memory. The system can receive, from a remote client device, a first digital image data of a first creative work, the first digital image data comprising a plurality of images of the first creative work. The system can determine, based on the first digital image data, one or more first feature variables, each of the first feature variables corresponding to a characteristic of the first creative work. The system can access a comparison dataset based on digital image data of a plurality of additional creative works, the comparison dataset comprising, for each of the additional creative works one or more associated author profiles, one or more associated creative work categories, and one or more corresponding feature variables. Additionally, the system can generate, based on at least the one or more first feature variables, a first author profile corresponding to an author of the first creative work. The system can train, with input including the one or more first feature variables and the comparison dataset, a first machine learning model to generate an output indicating an authenticity score of the first creative work.

Additionally, the system can also train, with input including the one or more first feature variables and the comparison dataset, a second machine learning model to generate an output indicating one or more additional author profiles associated with the first creative work. Similarly, the system can also train, with input including the one or more first feature variables and the comparison dataset, a third machine learning model to generate an output indicating one or more creative work categories associated with the first creative work. The system can then update, based on the output of the first machine learning model indicating an authenticity score of the first creative work, the comparison dataset to further comprise the one or more first feature variables and the first author profile. Additionally, the system can also update, based on the output of the second machine learning model indicating one or more revised author profiles associated with the first creative work, the comparison dataset to comprise one or more additional author profiles associated with, or corresponding to, the first author profile. Similarly, the system can also update, based on the output of the third machine learning model indicating one or more creative work categories associated with the first creative work, the comparison dataset to comprise one or more revised creative work categories, and store, in the non-transitory memory of the one or more processors, the updated comparison dataset. The system can then communicate, to the remote client device, the output of the first machine learning model indicating an authenticity score of the first creative work.

At least one aspect is directed to a non-transitory computer readable medium that can include one or more instructions stored thereon and executable by one or more processors. The one or more processors can receive, from a remote client device, first digital image data of a first creative work, the first digital image data comprising a plurality of images of the first creative work. The processors can determine, based on the first digital image data, one or more first feature variables, each of the first feature variables corresponding to a characteristic of the first creative work. And the processors may access a comparison dataset based on digital image data of a plurality of additional creative works, the comparison dataset comprising, for each of the additional creative works one or more associated author profiles, one or more associated creative work categories, and one or more corresponding feature variables. The processors can generate, based on at least the one or more first feature variables, a first author profile corresponding to an author of the first creative work. The one or more processors additionally configured to train, with input including the one or more first feature variables and the comparison dataset, a first machine learning model to generate an output indicating an authenticity score of the first creative work.

Additionally, the processors can train, with input including the one or more first feature variables and the comparison dataset, a second machine learning model to generate an output indicating one or more additional author profiles associated with the first creative work. The processors can train, with input including the one or more first feature variables and the comparison dataset, a third machine learning model to generate an output indicating one or more creative work categories associated with the first creative work. Moreover, the processors can also update, based on the output of the first machine learning model indicating an authenticity score of the first creative work, the comparison dataset to further comprise the one or more first feature variables and the first author profile. Additionally, the processors can also update, based on the output of the second machine learning model indicating one or more revised author profiles associated with the first creative work, the comparison dataset to comprise one or more additional author profiles associated with, or corresponding to, the first author profile. And the processors can update, based on the output of the third machine learning model indicating one or more creative work categories associated with the first creative work, the comparison dataset to comprise one or more revised creative work categories, and to store, in the non-transitory memory of the one or more processors, the updated comparison dataset. The processors can communicate, to the remote client device, the output of the first machine learning model indicating an authenticity score of the first creative work.

BRIEF DESCRIPTION OF THE FIGURES

These and other aspects and features of the present implementations are depicted by way of example in the figures discussed herein. Present implementations can be directed to, but are not limited to, examples depicted in the figures discussed herein. Thus, this disclosure is not limited to any figure or portion thereof depicted or referenced herein, or any aspect described herein with respect to any figures depicted or referenced herein.

DETAILED DESCRIPTION

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the known components referred to herein by way of description, illustration, or example.

Figure 1A:
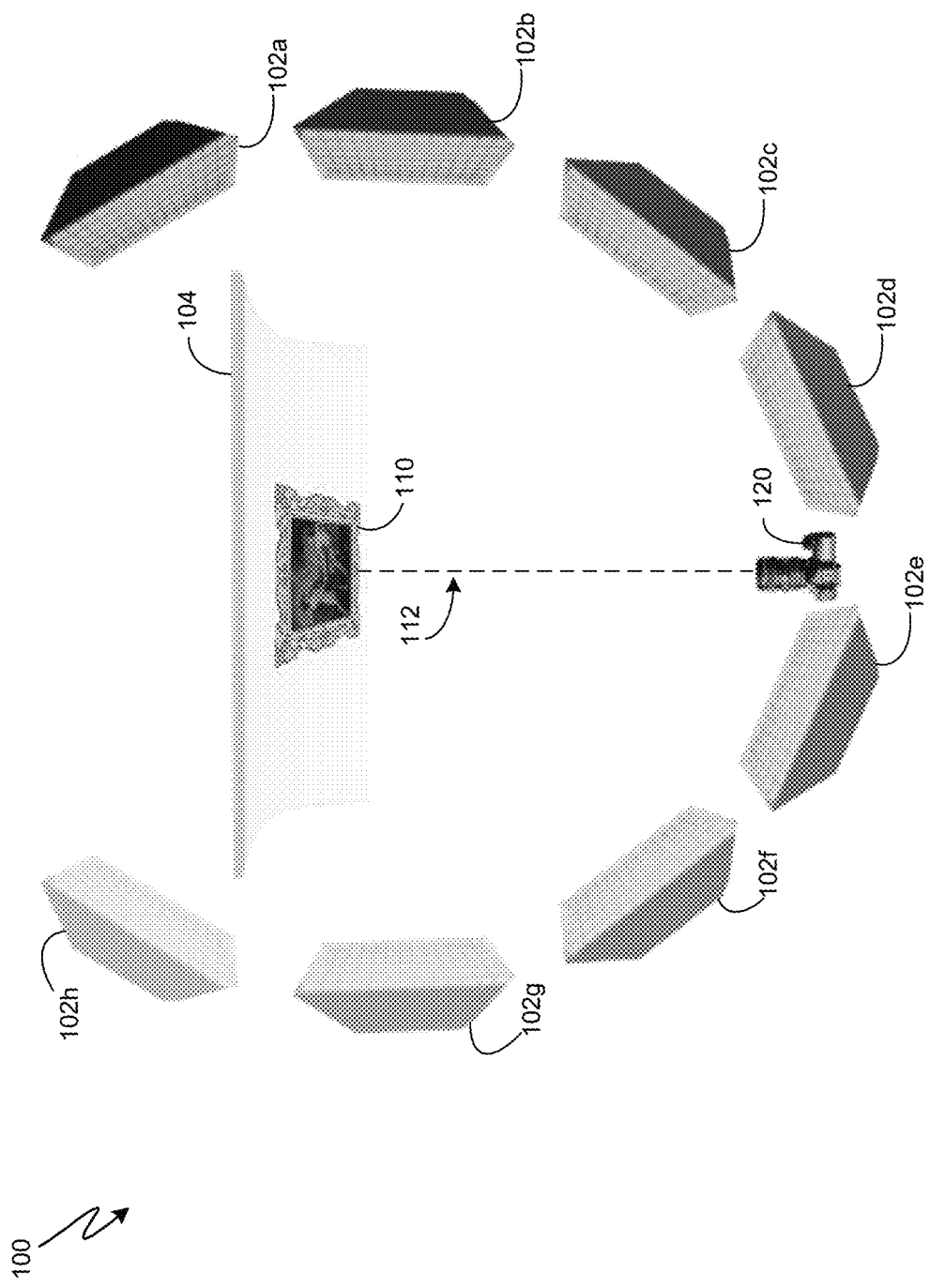
FIG. 1A is a diagram of a client device acquiring digital image data of a creative work at a first distance, according to one embodiment of the present disclosure.

FIG. 1A is a diagram of an image data acquisition environment 100, according to one embodiment of the present disclosure, including a client device 120 configured to collect, at a first distance 112, digital image data of a creative work 110. The client device 120 is configured to capture a digital image dataset (e.g., a plurality of digital images and associated metadata) of the creative work 110 from a first distance 112. The digital image dataset (e.g., digital image data comprising first digital image data, second digital image data, third digital image data, fourth digital image data, etc. and associated metadata respectively) can be used for an authentication of, or the generation of an authenticity score for, the creative work 110.

In some embodiments, the client device 120 comprises a digital imaging device (e.g., a CMOS or CCD image sensor of a digital imaging device, including the digital camera of a smartphone or other mobile device, a full frame digital camera (e.g., a Digital Single-Lens Reflex ("DSLR") camera) and the like) capable of acquiring digital image data that adheres to one or more minimum specifications of acceptable digital image data or otherwise capable of adhering to one or more minimum specification of an acceptable digital imaging device (e.g., minimum specifications of the client device 120). For example, the client device 120 can, in some embodiments, include any full frame digital camera, or digital imaging device, configured to output digital image data in a raw image file format and with at least an image resolution of 30 megapixels (e.g., a minimum of 30 megapixels, a minimum number of pixels-per-inch of the digital images output by the client device, a minimum size of the pixels of the client device's image sensor, etc.). Alternatively, in some embodiments, the client device 120 can include a full frame digital camera and one or more computer(s) coupled to the digital camera to receive the digital image data that it collects. Thus, the client device 120 need not be limited to a digital camera (e.g., the camera shown in FIGS. 1A and 1B) and it can include, in some embodiments, one or more processors (e.g., a desktop computer, laptop, smartphone, tablet, etc.) coupled to a digital camera (e.g., configured to receive the digital image data collected by the digital camera) and capable of communicating the digital image data collected by the digital camera to a server (e.g., the server 210 of FIG. 2) via a communications network (e.g., communications network 201 of FIG. 2).

In some embodiments, the client device 120 can be configured to capture digital image data (e.g., image data of the creative work 110) in a raw digital image file format. and associated metadata. For example, the client device 120 can output raw digital image files (e.g., raw digital image data) with associated metadata that can include one or more of the following: output resolution, sensor metadata (e.g., the size of the digital sensor, the attributes of the sensor's Color Filter Array ("CFA") and its color profile, etc.), image metadata (e.g., the exposure settings, camera model, lens model, etc.), the date and location of the shot/image, user information, and any other information to accurately (e.g., correctly) interpret the digital image data collected by the client device 120. Additionally, in some embodiments, the associated metadata of the digital image data (e.g., metadata of raw digital image files) output by the client device 120 can indicate, or can be used by the systems and methods of the present disclosure to determine that, the digital image data is the original (e.g., unmodified) data as it was collected by the image sensor of the client device 120. Thus, in some embodiments, the metadata associated with the digital image data collected by the client device 120 can be used to verify that the corresponding digital images have not been modified, altered, or otherwise changed from the image data collected by the image sensor of the client device 120.

In some embodiments, the client device 120 includes a physical support structure (not shown), including, for example, a tripod, gimble, adjustable stand, or other suitable support structure that can be configured to retain the client device 120 in a fixed position relative to the creative work 110. For example, the client device 120 can be disposed on a tripod that is configured to retain the client device 120 at the first distance 112 relative to the creative work 110 and with the creative work 110 disposed with a fixed position within the field of view for the client device 120 (e.g., configured to keep creative work 110 at the position with the FOV for the client device 120 set by a user of the client device 120). In some embodiments, the client device 120 can be configured on a mechanized support structure, which is configured to position the client device 120 relative to the creative work 110 (e.g., according to one or more positioning sensors configured to allow the mechanized support to determine the position of the client device 120 relative to the creative work 110) and automatically collect the image data of the creative work 110 at a variety of distances (e.g., the first distance 112 and the second distance 114, shown in FIG. 1B) and for on a variety of different regions of the creative work 110 (e.g., a foreground, a background, a subject, one or more quadrants, and the like).

The client device 120 can acquire digital image data or any portion thereof. For example, the client device 120 need not acquire all of the digital image data and, in some examples, the digital image data may be acquired by a plurality of different client devices. The digital image data (e.g., acquired by any number of client devices) can comprise one or more separate digital images of the creative work 110 viewed at the first distance 112. Accordingly, the present disclosure is not limited to digital image data acquired by a single client device or that is otherwise associated with (e.g., provided by, received from, etc.) any particular number of different sources of the image data. Examples of the present disclosure, therefore, can include any number of client devices (e.g., three different client devices that are each at separate locations (e.g., in different states) and that may individually, or relative to each other, acquire image data at any number of different times (e.g., acquire image data on, or over, different times, days, months, and years).

The one or more digital images of the creative work 110 may comprise, for example, an image of the entire creative work 110 (e.g., an entire canvas, a painting with its frame, an entire sculpture, etc.) with a minimum border of space between the creative work and the edges (e.g., frame) of the digital image. Stated differently, the digital image data captured by the client device 120 at the first distance 112, can include an image of the creative work 110 that is a complete image that includes all of the work 110 in a single image without any portion of the creative work 110 'touching' (e.g., coming into contact with) any of the edges of the digital image or a specified margin around the perimeter of the digital image. Additionally, the one or more digital images of the creative work 110 at the first distance 112 can include one or more additional images of the creative work 110 at the first distance 112 (e.g., one or more images of a foreground, background, subject, or detail of the creative work 110). In one embodiment, the digital image data of the creative work 110 may comprise a point cloud, or a set of data points in a three-dimensional coordinate system, where each point represents a single spatial measurement of the surface of the creative work 110. For example, the point cloud may comprise a volumetric capture of the creative work 110 that is derived from the digital image data (e.g., the one or more digital images) of the creative work 110. Alternatively, in some examples, the point cloud, or volumetric capture, of the creative work 110 may be collected instead of the one or more digital images of the creative work 110. Accordingly, in some examples of the present disclosure, the client device 120 (or one or more similar devices) may include one or more of a three-dimensional scanner, lidar imaging device, photogrammetry software or any other device capable of capturing a three dimensional point cloud, or volumetric capture, of the creative work 110. In some examples the volumetric capture of the creative work 110 may comprise a three-dimensional point cloud of a painting's surface. In other examples, the volumetric capture may comprise a three-dimensional point cloud of a sculpture or any other three-dimensional (e.g., non-planar) creative work.

Accordingly, in some embodiments, the first distance 112 may be a distance that is determined, in part, by the physical dimensions of the creative work 110 (e.g., to enable the client device 120 to capture the entire creative work 110 in a single image). For example, a first distance 112 may be a shortest distance between the client device 120 and the creative work 110 at which the client device 120 can capture a correctly framed (e.g., within specified minimum margins) digital image of the creative work 110. Alternatively, in some embodiments, the first distance 112, may be determined, in part, according to a specified minimum threshold distance between the client device 120 and the creative work 120 (e.g., shortest distance, above a minimum distance, that produces a fully framed image of the creative work 110).

In some embodiments, the data acquisition environment 100 can include one or more lighting systems 102a-102f configured to illuminate the creative work 110 and enable the client device 120 to collect accurate image data of the creative work 110.

Figure 1B:
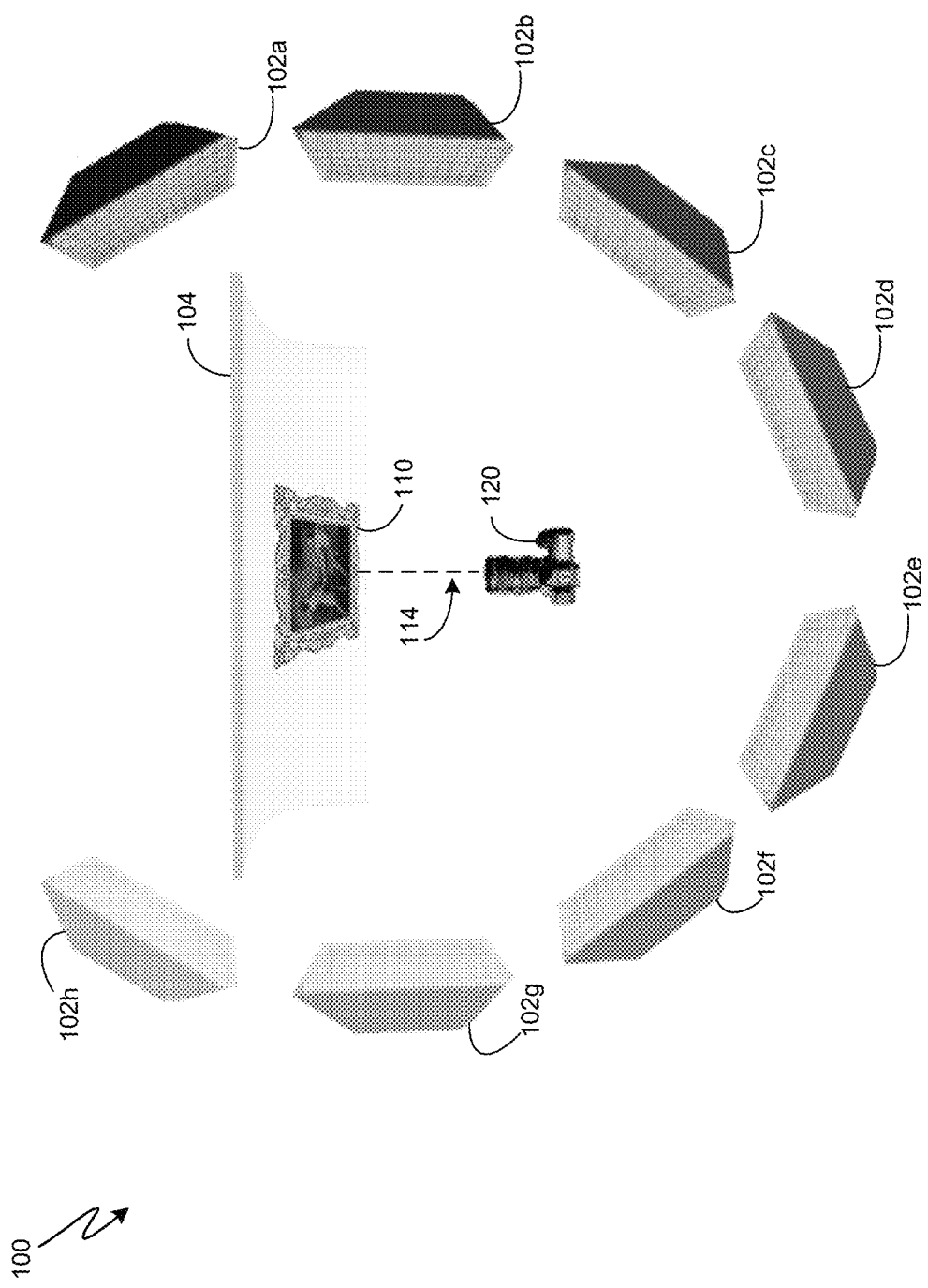
FIG. 1B is a diagram of a client device acquiring digital image data of a creative work at a second distance, according to one embodiment of the present disclosure.

FIG. 1B is a diagram of the client device 120 configured to acquire digital image data of the creative work 110 at a second distance 114, according to one embodiment of the present disclosure. The client device 120 can acquire digital image data that comprises a plurality of digital images of the creative work 110 at the second distance 114. For example, in some embodiments, the client device 120 can be positioned at the second distance 114 to output digital images of only specific portions in (e.g., less than the entirety of) the creative work 110. For example, at the second distance 114, the client device 120 can collect one or more digital images of specific regions of the creative work 110 (e.g., image data of the creative work 110 divided into a single quadrant, or fourth, in each individual image, image data collected by dividing the creative work into 6, 9, 12, or more sections, etc.). In some embodiments, the client device 120 can collect image data based on a specified physical size (e.g., images that are 1×1 inches, 3×3 inches, etc.) and based on different traditional types of subject matter that may exist within the creative work 110, including, for example, collecting digital images of a foreground region, a background region, a subject region, a damage region, a back (or canvas) region, a signature or calligraphic region, and the like. In some embodiments, the client device 120 may be substituted with a different client device (e.g., a similar or substantially identical client device to the client device 120, as may allow for ease and convenience of not moving the client device 120 between different distances from the creative work).

In some embodiments, for example, the client device 120 may capture image data of the creative work comprising at least the following digital images of a creative work to be authenticated, or for which an authenticity score may be generated: at least two digital images of the entire creative work; at least two detail digital images of the creative work, each collected at a third distance, less than the first distance 112 (e.g., a distance between 40-70 cm), and with the client device 120 positioned directly in front of the detail to be captured in the digital image(s); at least two closeup detail images, each image capturing separate details of the creative work, the client device 120 positioned directly in front of the detail(s) to be imaged, and collected at a fourth distance that is less than the third distance 114 (e.g., a distance between 15-25 cm); at least one image of the entire backside of the creative work (e.g., digital image 602, shown in FIG. 6); at least one backside detail image (e.g., support image data 604, shown in FIG. 6), and at least two images of separate details with the client device 120 positioned at a 45 degree angle relative to the border of the canvas mount (e.g., with the imaging device angled 45 degrees from the edge of the frame, or support, of a painting).

Figure 2:
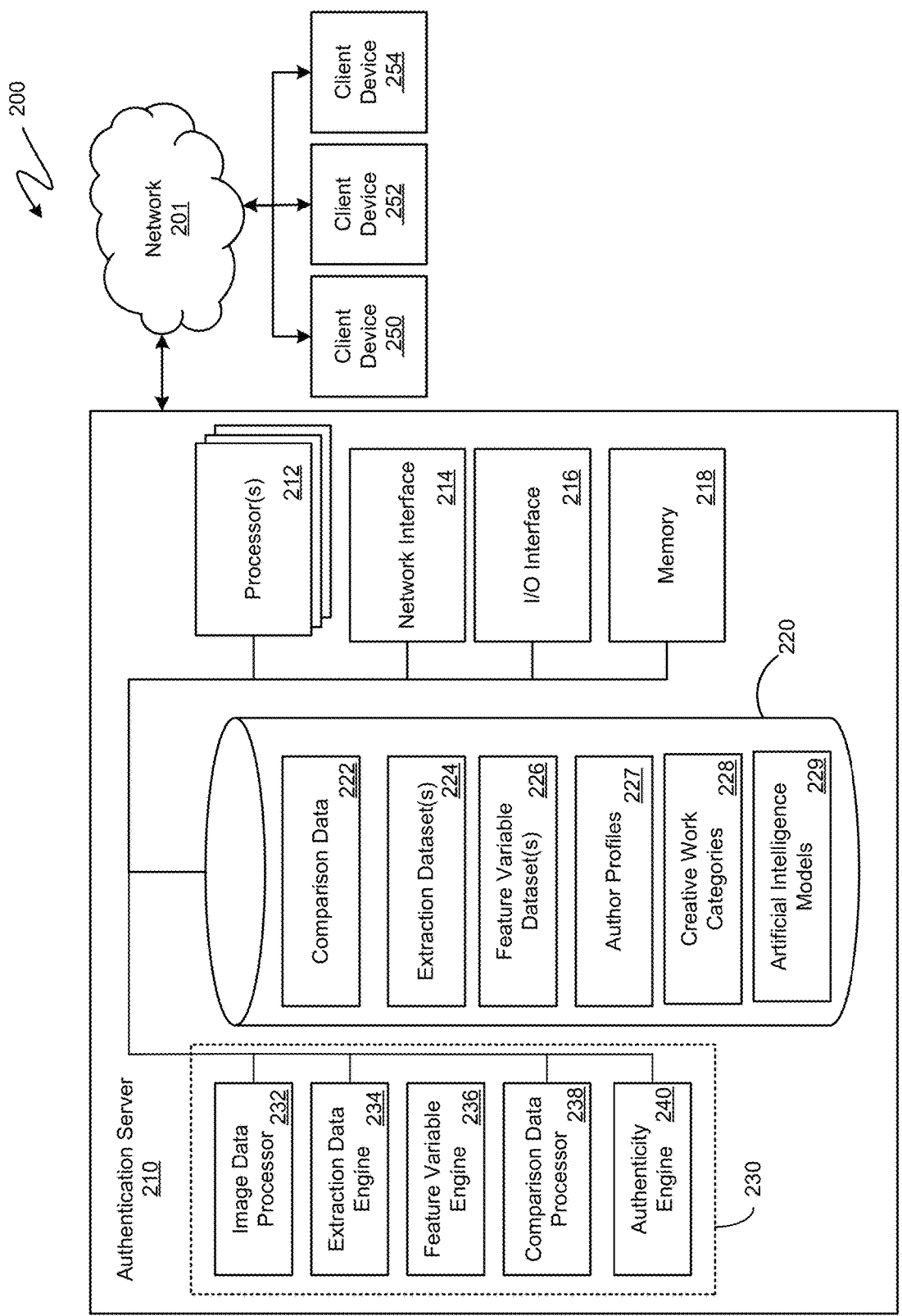
FIG. 2 is a block diagram of a creative work authenticity system, according to one embodiment of the present disclosure.

FIG. 2 is a block diagram of a creative work authenticity system 200, according to one embodiment of the present disclosure. The system 200 can include the authentication server 210 in communication with one or more client devices 250, 252, 254 via a communication network 201.

The client devices 250, 252, and 254 may be any suitable digital imaging device (or combination of imaging device and one or more processors and/or computing devices) that is capable of collecting image data of a creative work and communicating, via the network 201, the collected digital image data to the authentication server 201, as described above with reference to the client device 120 shown in, and described with reference to, FIGS. 1A and 1B. For example, the client devices 250, 252, and 254 may include, in some embodiments, a full frame digital camera coupled to one or more processors capable of communications (e.g., transmitting digital image data of a creative work, including metadata associated with one or more collected digital images) via the network 201. In that example, the digital camera of the one or more client devices 250, 252, and 254 may be a full frame digital camera capable of outputting digital images in a raw image file format and with a digital resolution of at least 30 Megapixels. The one or more processors coupled to the digital camera may include a laptop or mobile (e.g. smartphone or tablet) computing device that is capable of receiving the digital image data collected by the digital camera and communicating it, via the network 201 (e.g., the internet), to one or more authentication servers (e.g., authentication server 210). As described previously, with reference to FIGS. 1A and 1B, a variety of different configurations are contemplated for each, or both, of the client device(s) and/or the authentication server 210, or any of the components or data included in either, or both, of those.

The authentication server 210 can include one or more processors 212, a network interface 214, an input/output ("I/O") interface 216, and a memory 218. The one or more processors 212 may include one or more general purpose devices, such as an Intel®, AMD®, or other standard microprocessor. Alternatively, or in addition, in some embodiments, the one or more processors 212 may include a special purpose processing device, such as ASIC, SoC, SiP, FPGA, PAL, PLA, FPLA, PLD, or other customized or programmable device. The one or more processors 212 can perform distributed (e.g., parallel) processing to execute or otherwise implement functionalities of the presently disclosed embodiments. The one or more processors 212 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, fliM® OS/2® operating systems, and so forth.

The network interface 214 may facilitate communication with other computing devices and/or networks such as the communications network 201 and the client devices 250, 252, and 254 and/or other devices (e.g., one or more additional authentication server(s)) and/or communications networks. The network interface 214 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 214 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The I/O interface 216 may facilitate interfacing with one or more input devices and/or one or more output devices. The input device(s) may include a keyboard, mouse, touch screen, scanner, digital camera, digital imaging sensor(s), light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The memory 218 may include static RAM, dynamic RAM, flash memory, one or more flip-flops, ROM, CD-ROM, DVD, disk, tape, or magnetic, optical, or other computer storage medium. The memory 218 may include a plurality of engines (e.g., program modules or program blocks) 230 and program data 220. The memory 218 may be local to the authentication server 210, as shown, or may be distributed and/or remote relative to the communication authentication and verification server 210.

The memory 218 may also include program data 220. Data generated by the system 210, such as by the engines 230 or other components of server 210, may be stored on the memory 218, for example, as stored program data 220. The stored program data 220 may be organized as one or more databases. In certain embodiments, the program data 220 may be stored in a database system. The database system may reside within the memory 218. In other embodiments, the program data 220 may be remote, such as in a distributed (e.g., cloud computing, as a remote third-party service(s), etc.) computing and/or storage environment. For example, the program data 220 may be stored in a database system on a remote computing device. In still other embodiments, portions of program data 220m, including, for example, one or more output(s) generated by the engines 230, may be stored in a content addressable storage system, such as a blockchain data storage system.

The authentication server 210 further includes server data 220, comprising a comparison data 222, one or more extraction datasets 224, one or more feature variable datasets 226, author profiles 227, creative work categories 228, and one or more artificial intelligence models 229.

The comparison data 222 may include one or more datasets based on (e.g., generated from), the digital image data of a plurality of additional creative works. The comparison data 222 may include, for example, the digital image data collected for each of the additional creative works in the plurality of additional creative works (e.g., each digital image dataset of an additional creative work that has been received by the authentication server 210). In some embodiments, the comparison data 222 may include one or more imagery datasets Additionally, the comparison data 222 may include one or more of the feature variable datasets 226, including a set of one or more feature variables for each of the additional creative works of the plurality of additional creative works (e.g., one or more feature variable(s) previously determined, by the authentication server 210 and/or feature variable engine 236, for an additional creative work and based on the corresponding digital image dataset received by the server 210 or image data processor 232). For example, the comparison data 222 may include a feature variable dataset 226 for each additional creative work that includes the one or more feature variables determined (e.g., by the feature variable engine 236) for that same creative work. In some embodiments, the comparison dataset may include a subset of the feature variables determined for an additional creative work and included in the corresponding feature variable dataset 226.

Each set of feature variables included in the comparison data can be comprised of any combination of one or more of the different types of feature variables included in the feature variable datasets 226 and described in greater detail below, with reference to the feature variable datasets 226.

The one or more extraction datasets 224 can include one or more datasets extracted or otherwise generated from the received image data (e.g., the image data received for the creative work to be authenticated). Alternatively, or in addition, in some embodiments, the extraction datasets 224 can include extraction data generated from one or more imagery datasets, or generated by the extraction engine 234 based on the image data of the creative work. In some embodiments, the extraction engine may generate one or more different types of extraction datasets, including, for example, one or more color (e.g., a highlights, mid-tones, and blacks distribution, a chromatic spectrum, a chromatic hatching, and a chromatic volumes) extraction datasets, one or more volumetric (e.g., craquelure patterns, craquelure details, brush patterns, canvas details, canvas weave pattern, backside/support detail) extraction datasets (e.g., the volumetric extraction dataset 510 and the brushstroke extraction dataset 512, shown in FIG. 5), and one or more calligraphic (e.g., signature detail(s), calligraphic brush pattern(s), backside pattern) extraction datasets.

Alternatively, or in addition, the extraction engine 234 may generate one or more extraction datasets that can include separately or in combination, for example, palette data, mid-tones data, pattern data, campiture data, pigment density data, signature material data, signature color data, signature evaluation data, and evaluation of pressure points data.

The one or more feature variable datasets 226 can include each set of feature variables determined for a creative work during operation of the system 200 (e.g., during the operation of the server 210 to generate an authenticity score of, or otherwise ascertain authenticity of, that creative work). The feature variable datasets 226 can include a plurality of feature variable datasets with one or more feature variables determined for a particular (e.g., a single specific) creative work. The feature variables stored in the various sets of the feature variable datasets 226 can include, for example, one or more of the following, non-exhaustive and non-limiting, list of different feature variables: a pantone series, a posturized pantone series, a brights percentage, a mid-tones percentage, one or more discrepancies with a previous image data for the same creative work (or the output(s) generated based on the previous image data), a brush sign frequency map on a subject of the creative work, a brush sign frequency map on a background of the creative work, a positive campiture percentage, a composition probability map of a creative work, a pigment density map, a pigment permeation map, a signature pantone code, a signature tag word, a calligraphic sign vector, and a calligraphic pressure map. Additionally, in other embodiments, the feature variable datasets 226 may include one or more additional feature variables that are not expressly included in the above list of feature variables but that, nevertheless, are inherently disclosed in the variety of different feature variables that are expressly disclosed in the list above. For example, in some embodiments, the one or more feature variable datasets may include a modified version of one or more feature variables, including a combination of one or more of the feature variables listed above.

Each set in the feature variable datasets 226 can include its one or more feature variables (e.g., the feature variable data, or the feature variables themselves) and associated metadata that identifies at least one creative work (or its digital image data) associated with that set of feature variables. For example, metadata associated with, or contained in, a feature variable dataset can identify one or more, or all, of: creative works used to determine the feature variables corresponding to that set of feature variables; one or more comparison data (or comparison datasets) with, in some examples, one or more corresponding sets of feature variables, and the like.

The author profiles 227 can include a plurality of different author profiles (or author profile data) and each author profile corresponds to a single author of one or more creative works (e.g., an author of one or more of the plurality of additional creative works associated with a comparison dataset). Each of the author profiles 227 can include one or more different pieces of information regarding its corresponding author. For example, an author profile can include at least one name associated with the profile's author (e.g., one or more given or legal names, one or more stage or pen names, or one or more pseudonyms of the author). An author profile can also include one or more periods of time associated with the author or one or more of the author's creative works (e.g., an period of time defined by the author's lifetime, one or more periods of time defined by the publication date(s) for one or more of the author's creative works, a period of time associated with one or more of the author's creative works that are associated with one or more creative work categories (e.g., one or more movements or art styles). Additionally, an author profile may include one or more geographic location(s) associated with the author, including, for example, a birthplace of the author, one or more primary residences of the author and associated with one or more of the author's creative works, a geographical region of one or more influential vacations associated with the author, etc.). In some embodiments, an author profile may contain one or more known, or previously authenticated, creative works associated with the author or any of the author's creative works. For example, the author profile may identify a plurality of creative works that substantially influenced the characteristics of, or the style used in, one or more of the author's creative works (e.g., one or more creative works of another author that was an influential instructor or teacher to the author of the profile). In some embodiments, an author profile may include one or more characteristics associated with the author's creative work(s) and associated with one or more creative works of one or more different author(s). In some embodiments, the author profile may include one or more types of information not expressly included in the examples of author profile information that are described above. For example, in some embodiments, an author profile may include one or more additional types of information regarding the profile's author, including, for example, a modified version of one or more examples of author profile information described above and may include one or more combinations of two or more of the examples of author profile information described above.

The creative work categories 228 can include one or more different categories of creative work(s), which may comprise an association between the one or more creative works (or one or more of their characteristics) included in that category of creative works. For example, the creative work categories may include one or more categories of creative works according to an artistic style or creative movement that is associated with each of the creative works (or their characteristics) included in that category. For example, the creative work categories 228 can include one or more categories of creative work(s), which include an association of each creative work (or its characteristics) included in the category of creative works. For example, the creative work categories 228 can include categories for creative works associated with one or more of the following non-limiting and non-exhaustive list of example categories: a tenebrosi category, a baroque category, an impressionist category, a surrealist category, a cubism category, a pop art category, a photorealistic category, and the like. Some embodiments may include one or more additional categories of creative works beyond the non-limiting list of example categories above. For example, the categories of creative work(s) may include a category for an association between a plurality of creative works (or their characteristics) based on one or more general criteria, principals, patterns, and the like, that may be substantially present in, or define an association between, each of the creative works included in (or associated with) that category.

The one or more artificial intelligence models 229 can include one or more machine learning models trained to generate an output based on one or more matching portions of the results for a digital image dataset of a creative work (e.g., one or more feature variables, one or more author profiles, one or more creative work categories, or digital image data, etc.) and of a comparison dataset (e.g., one or more corresponding feature variables, author profile(s), creative work categories, or digital image data) used to determine an authenticity score or authenticity result of, or otherwise ascertain an authenticity for, the creative work captured, or otherwise included, in the corresponding image data (e.g., the creative work imaged by one or more of the client devices 250, 252, 254 or otherwise captured in received image data, including first image data, second image data, third image data, fourth image data, etc.). For example, the models 229 can include an artificial intelligence model trained to identify any feature variables that are present in the comparison dataset used to determine the authenticity of the creative work (e.g., the creative work in the image data received by the authentication server 210, such as (in some examples) from one or more client devices 250, 252, or 254). For example, the authenticity engine 240 can execute the artificial intelligence model to identify and associate creative works, or their associated feature variables, author profiles, etc., via updates to the comparison dataset used to authenticate (e.g., generate an authenticity score for) the creative work in the image data received by the server 210. In some implementations, the authentication server 210 (or comparison data processor 238) can execute one or more of the artificial intelligence models 229 of program data 220 in response to determining one or more feature variables for a digital image data output by the image data processor 232.

In some examples, the artificial intelligence models 229 of the authentication server 210 can be, or may include, one or more neural networks. Each of the artificial intelligence models 229 can be a single shot multi-box detector, and can process an entire dataset of the received image data (e.g., digital image data, one or more feature variables, author profile(s), and the creative work categories of the creative work to be authenticated) in one forward pass. Processing the entire dataset of the creative work (e.g., the creative work to be authenticated) in one forward pass can improve processing efficiency, and enables the artificial intelligence models of the authentication server 210 to be utilized for creative work authentication tasks in near real time or with minimal delay (e.g., minimal delay between the time when image data of the creative work is collected and the authenticity result of the creative work is provided).

In some examples, one or more of the artificial intelligence models 229 can incorporate aspects of a deep convolutional neural network (CNN) model, which may include one or more layers that may implement machine-learning functionality for a portion of the operations performed by the engines 230. The one or more layers of the models 229 can include, in a non-limiting example, convolutional layers, max-pooling layers, activation layers and fully connected layers, among others. Convolutional layers can extract features from the input image dataset(s) (or input comparison data) of the creative work using convolution operations. In some examples, the convolutional layers can be followed, for example, by activation functions (e.g., a rectified linear activation unit (ReLU) activation function, exponential linear unit (ELU) activation function, etc.), model. The convolutional layers can be trained to process a hierarchical representation of the input data (e.g., input image data and/or feature variables based on the same), where lower level features are combined to form higher-level features that may be utilized by subsequent layers in the artificial intelligence model(s) 229 or the execution of a corresponding machine learning model (e.g., execution of one or more of the artificial intelligence models 229 by one or more of the feature variable processor 236, the comparison data processor 238, or the authenticity engine 240).

The artificial intelligence model(s) may include one or more max-pooling layers, which may down-sample the feature maps produced by the convolutional layers, for example. The max-pooling operation can replace the maximum value of a set of pixels in a feature map with a single value. Max-pooling layers can reduce the dimensionality of data represented in the image data processor 232, the extraction data engine 234, the feature variable engine 236, the comparison data processor 238, the authenticity engine 240, and any (or all) of the one or more artificial intelligence models 229. The one or more of the models 229 may include multiple sets of convolutional layers followed by a max-pooling layer, with the max-pooling layer providing its output to the next set of convolutional layers in the artificial intelligence model. The model(s) 229 can include one or more fully connected layers, which may receive the output of one or more max-pooling layers, for example, and generate predictions (e.g., an authenticity score, associated author profile(s), associated creative work categories, etc.) as described herein. A fully connected layer may include multiple neurons, which perform a dot product between the input to the layer and a set of trainable weights, followed by an activation function. Each neuron each neuron in a fully connected layer can be connected to all neurons or all input data of the previous layer. The activation function can be, for example, a sigmoid activation function that produces class probabilities for each object class for which the artificial intelligence model is trained. The fully connected layers may also predict the bounding box coordinates for each object detected in the input dataset(s) (e.g., in one or more feature variables of the creative work to authenticate or one or more corresponding portions of the comparison dataset).

The authentication server 210 may include several engines 230 (e.g., program modules) including, an image data processor 232, an extraction data engine 234, a feature variable engine 236, a comparison data processor 238, and an authenticity engine 240.

The engines 230 may include all or portions of the other elements of the authentication server 210 (e.g., program data 220, the processors 212, etc.). The engines 230 may run multiple operations concurrently or in parallel by or on the one or more processors 212. In some embodiments, portions of the disclosed engines, processors, components, blocks, and/or facilities are embodied as executable instructions embodied in hardware or in firmware, or stored on a non-transitory, machine-readable storage medium, such as the memory 218. The instructions may comprise computer program code that, when executed by a processor and/or computing device, cause a computing system (such as the processors 212 and/or the authentication server 210) to implement certain processing steps, procedures, and/or operations, as disclosed herein (e.g., one or more steps of methods 300 and 400, which are described below with reference to FIGS. 3 and 4, respectively). The modules, components, and/or facilities disclosed herein may be implemented and/or embodied as a driver, a library, an interface, an API, FPGA configuration data, firmware (e.g., stored on an EEPROM), and/or the like. In some embodiments, portions of the engines, processors, components, blocks, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the engines and processors disclosed herein may be referred to as controllers, layers, services, modules, blocks, facilities, drivers, circuits, and/or the like.

The image data processor 232 can receive and process the digital image data collected by a client device 250, 252, 254 and received by the authentication server 210 via the network 201. The image data processor 232 may identify a creative work associated with each set of digital image data that the server 210 receives or stores (e.g., in program data 220 and/or memory 218) to determine the authenticity of (e.g., authenticity score(s) or other authenticity result(s) of) one or more creative work(s). Accordingly, in some embodiments, the image data processor 232 may identify one or more sets of image data associated with the same creative work (e.g., separate sets of image data received to generate multiple authenticity scores for the same creative work).

In some embodiments, the image data processor 232 may verify whether a received digital image dataset adheres to one or more mandatory criteria (e.g., minimum specifications) for the acquisition of acceptable image data of a creative work. For example, the image data processor 232 may verify whether a received digital image dataset comprises digital image data in one or more file formats (e.g., a raw digital image file or the like), whether the digital image data (or the imaging device used to collect it) satisfies one or more minimum technical specifications (e.g., a minimum image resolution, a minimum digital image sensor size, etc.), and/or whether the digital image data has been collected according to specified imaging criteria (e.g., whether images are properly framed, whether image data was collected at proper distance(s), etc.). For example, the image data processor 232 may verify whether an image dataset was collected at a specified first distance by calculating an expected pixels per inch of the image dataset and determining an actual pixels per inch of the image dataset and comparing the expected pixels per inch with the actual pixels per inch.

For example, in some embodiments, the image data processor 232 may determine an expected pixels per inch (e.g., at a first distance) for one or more digital images of the image dataset based on a digital image output resolution for the digital imaging device used to collect the image dataset and an expected (e.g., required) first distance. Additionally, in some embodiments, the image data processor 232 may determine an actual pixels per inch (e.g., at the first distance) for the one or more digital images of the image dataset based on the actual digital resolution of the one or more digital images and one or more physical dimensions of the creative work depicted in the image dataset. Accordingly, in some embodiments, the image data processor 232 may determine an actual pixels per inch of one or more digital images based on the actual resolution of the one or more images and based on the height or length of the creative work (e.g., a side length of a flat (substantially two-dimensional) painting (canvas) or a known length of a three-dimensional creative work or sculpture).

The extraction engine 234 can extract or otherwise generate one or more separate imagery datasets from the image data received for a creative work (e.g., output by the image data processor 232). The extraction engine 234 may generate each of the one or more separate imagery datasets to include a specified type, or types, of digital images of the creative work. For example, the extraction engine 234 can generate a color imagery dataset comprising that portion of the image data pertinent to an analysis of one or more colors present in the creative work (e.g., embodiments of a color imagery dataset may exclude digital images that depict only the backside/rear canvas of a creative work). As another example, the extraction engine 232 can generate a volumetric image dataset comprised of that portion of the image data that is associated with, or depicting a portion of, the volumetric features of the creative work. Similarly, in yet another example, the extraction engine 232 may generate a calligraphic imagery dataset using that portion of the digital image data that captures at least a portion of the calligraphy data that may be present in the image data of the creative work to be authenticated. In some embodiments, the extraction engine 234 may generate each of the one or more separate imagery datasets to include only a specified type, or types, of digital images of the creative work.

The extraction engine 234 can generate one or more extraction datasets from the image data of a creative work (e.g., the image data received by or output from the image data processor 232) or, alternatively, from one or more imagery datasets generated, by the extraction engine 234, based on the image data of the creative work. In some embodiments, the extraction engine may generate one or more different types of extraction datasets, including, for example, one or more color (e.g., a highlights, mid-tones, and blacks distribution, a chromatic spectrum, a chromatic hatching, and a chromatic volumes) extraction datasets, one or more volumetric (e.g., craquelure patterns, craquelure details, brush patterns, canvas details, canvas weave pattern, backside/support detail) extraction datasets (e.g., the volumetric extraction dataset 510 and the brushstroke extraction dataset 512, shown in FIG. 5), and one or more calligraphic (e.g., signature detail(s), calligraphic brush pattern(s), backside pattern) extraction datasets.

Alternatively, or in addition, the extraction engine 234 may generate one or more extraction datasets that include, for example, one or more extraction datasets for one or more of: palette data, mid-tones data, pattern data, campiture data, pigment density data, signature material data, signature color data, signature evaluation data, and evaluation of pressure points data.

For example, the extraction engine 234 may generate one or more color extraction datasets based on one or more digital images of a color image dataset, which the extraction engine 234 generated from a subset of the digital images included in the image data received for a creative work (e.g., digital image data, one or more digital image data packs, output from the image data processor 232 or received, via network 201, from one of the client devices 250, 252, 254). As another example, the extraction engine 234 may extract a calligraphic, or signature, extraction dataset (e.g., calligraphic extraction dataset 710 shown in FIG. 7) from a calligraphic imagery dataset that only includes at least one digital image of the backside of the creative work (e.g., backside image data 602, backside support image data 604, and canvas extraction dataset 610, each shown in FIG. 6), and at least one digital image of any calligraphy (e.g., any author signature(s) or any other stylized writing) that is present in the creative work.

The feature variable engine 236 can determine one or more feature variables of a creative work based on one or more of the received image data (of the creative work), a plurality of imagery datasets generated by the extraction engine 234 based on the received image data, or one or more extraction datasets generated by the extraction engine 234 (e.g., as described in greater detail above). The one or more feature variables determined by the feature variable engine 236 may include, for example, one or more of: a pantone series, a posturized pantone series, a brights percentage, a mid-tones percentage, discrepancies with previous image data (or output(s) based on the previous image data) of the same creative work, a brush sign frequency map on a subject of the creative work, a brush sign frequency map on a background of the creative work, a positive campiture percentage, a probability map for a composition of the creative work, a pigment density and permeation map, a signature pantone code, a signature tag word, a calligraphic sign vector, and a calligraphic pressure map.

The comparison data processor 238 can process one or more portions of the comparison data 222, including to identify one or more comparison datasets to use in generating an authenticity estimation, an authenticity score, or any other authenticity result, for a creative work. For example, the comparison data processor 238 may identify a comparison dataset based on one or more similarities between the comparison dataset and the creative work for which an authenticity score will be generated. More specifically, the comparison data processor 238 may identify a comparison dataset from a plurality of additional creative works that were created within the same geographic region, or during substantially the same time period, as the creative work to be authenticated.

Alternatively, or in addition, the comparison data processor 238 may identify a comparison dataset based on one or more creative work categories associated with, or one or more additional creative works that include, one or more feature variables that are substantially similar to (e.g., nearly identical or having only difference(s) below a specified threshold) the one or more feature variables determined for the creative work being authenticated. Alternatively, in some embodiments, the comparison data processor 238 may identify a comparison dataset from a plurality of creative works that includes only a minor subset (e.g., a small minority) of creative works that are substantially similar to the creative work being authenticated. The comparison data processor 238 may determine a number of additional creative works to include in a comparison dataset based, in part, on the number of substantially similar creative works that it will include and the extent of any similarities (e.g., a match percentage) between the plurality of additional creative works of a comparison dataset and with the creative work to be authenticated.

Additionally, the comparison data processor 238 may modify (e.g., update) one or more portions of the comparison data 222 according to a modified comparison dataset. The modified comparison dataset may be determined from, or indicated by, one or more of the output(s) generated by one or more components of the server 210 (e.g., the extraction data engine 234, the feature variable engine 236, and the authenticity engine 240). For example, the authentication engine 240 and the feature variable engine 236 may output, via one or more machine learning models used to generate an authenticity score, a modified metadata for the comparison dataset used to generate a new authenticity score, which identifies a modified set of associated creative works and/or aspects of the same (e.g., author profile(s), creative work categories, etc.).

The comparison data processor 238 can modify a portion of the comparison data 222 based on the output(s) generated by the one or more artificial intelligence models 229 (e.g., a modified comparison dataset indicated by the output(s) generated by one or more machine learning models implemented by the authenticity engine 240. For example, the comparison data processor 238 may modify a portion of the comparison data 222 (e.g., a first comparison dataset) according to a determination to add a new creative work to a set of creative works associated with one or more of the following: one or more characteristics of a creative work, one or more author profile(s) (e.g., one or more author profiles for author(s) that taught, criticized, or otherwise influenced, the author(s) of an associated creative work), one or more creative work categories (e.g., a 'tenebrosi' category, a baroque category, an impressionist category, a pop art category, a photorealistic category, etc.), one or more geographic region(s) (e.g., a geographic region where a creative work was created or otherwise associated with a creative work), and one or more time period(s) (e.g., time period defined by one or more author(s), a time period defined by the creation of one or more creative works, etc.). determine one or more portions of the comparison data 222 associated with one or more characteristics of to include in a comparison dataset used to generate an authenticity score of a creative work, (e.g., creative work 110).

The authenticity engine 240 may generate an authenticity score (or other authenticity indication) for the creative work of the image data received by the authentication server (e.g., from one of the client devices 250, 252, 254) for the creative work. The authenticity engine 240 may include one or more artificial intelligence models 229 that are trained to generate one or more output(s) based on a comparison of the determined set of feature variables and the comparison dataset identified by the comparison data processor 238. The authentication engine 240 may execute the one or more artificial intelligence models 229 to generate an output indicative of an authenticity score for the creative work of the determined set of feature variables and one or more outputs indicative of change(s) to the comparison dataset, which reflect the new comparison data generated from the authentication of the first creative work. The authenticity engine 240 may execute a first artificial intelligence model trained to generate an output indicative of an authenticity score for the first creative work (e.g., the creative work to be authenticated), based on inputs that include at least the determined set of feature variables (of the creative work to be authenticated) and the comparison dataset output by the comparison data processor 238. For example, the first artificial intelligence model may be trained to generate the output indicative of the authenticity score based on a determined match percentage for the determined set of feature variables and one or more corresponding sets of feature variables (e.g., one or more sets of feature variables that exhibit a matching percentage (e.g., a percentage of matching feature variables) that is directly correlated with (e.g., proportional to) the probable authenticity of, and thus the authenticity score generated for, the creative work being authenticated by system 200.

In some embodiments, the authenticity engine 240 can partition, into two or more subsets, each of the following that a creative work to be authenticated: one more feature variables, a plurality of different image data packs, one or more datasets extracted from an image data pack, and the received digital image data for that creative work. For example, the authenticity can partition, for a creative work to be authenticated, each of the information listed above into two or more subsets associated with different authors. The authenticity engine 240 may, for example, use the two or more subsets associated with different authors for a comparison of the information for a creative work against itself, which may be part of the process to generate the authenticity score of that creative work. In some embodiments, the authenticity engine 240 (or authentication server 210) can partition the information above into at least one subset associated with an author and one or more subsets not associated with any author, or for which no author can be determined.

In some embodiments, the authenticity engine 240 (or the processors of the authentication server 210) can determine a consistency metric of the two or more subsets based on a comparison of one or more portions of two or more corresponding datasets in each of the different subsets. The consistency metric may be determined with a comparison of two or more entire subsets (e.g., using corresponding values or metrics that are representative of, or based on, the contents of the corresponding subset). Alternatively, or in addition, the consistency metric of two or more subsets may be determined by a piecewise comparison using the corresponding individual types of data contained in the two or more subsets (e.g., comparing, between the two or more subsets, each of the following: feature variables, digital image data packs, datasets extracted from digital image data packs, etc.). In some embodiments, the consistency metric of two or more subsets may be based on a variance (e.g., variance data or vector) between the two or more subsets (or, for a piecewise comparison, their individual contents).

In some embodiments, the authenticity engine 240 (or the processors of the authentication server 210) can determine an internal consistency metric for a single subset (e.g., of the two or more subsets partitioned by the authenticity server 240, as described above) based on a comparison of one or more portions of data in the different datasets (e.g., feature variables, digital image data, digital image data packs, etc.) within that same subset. For example, the authenticity engine 240 may determine an internal consistency metric based on a variance of one or more types of datasets contained in that subset (e.g., a variance of the feature variables, a variance of the digital image packs, etc.). Alternatively, or in addition, the internal consistency metric for a single subset may be determined based on a comparison with an expected variance between two different types of datasets of the subset and an actual, or determined, variance between those same two types of datasets of the subset (e.g., a comparison of an expected variance between a feature variable and a digital image data pack with an actual variance that is determined for that feature variable and digital image data pack within the same subset).

In some embodiments, the authenticity engine 240 can determine, based on a comparison of the consistency metric of the two or more subsets and the internal consistency metric of a single subset, a confidence score for one or more of the datasets (e.g., one or more feature variables, image data packs, etc.) associated with the first creative work (or its digital image data). For example, in some embodiments, the authenticity engine 240 can determine a confidence score based on whether either (or both) of the consistency metric of the two or more subsets and the internal consistency metric are less than a threshold. Alternatively, or in addition, the authenticity engine 240 may determine a confidence score based on a determination that the difference of two consistency metrics does, or does not, exceed a threshold. In some embodiments, the authenticity engine 240 can determine a confidence score based on the difference between an expected mathematical relation of the consistency metrics and a corresponding actual, or computed, mathematical relation of the consistency metrics.

In some examples, the system 200 can be configured to automatically recognize flat surfaces, borders, edges, etc. and other boundaries of a creative work, which it may automatically scan and capture the digital image data (e.g., a plurality of digital images, three-dimensional point cloud data, gamma rays, etc.) and perform the digital image data extraction process (or any portions thereof) that is described above. For example, the system 200 configured for automatic scanning and capture of one or more creative works may include an application programming kit, or application programming interface, configured for integration into a mobile device or one or more third-party applications (e.g., one or more mobile device applications, desktop programs, website API calls, etc.).

Additionally, in some examples, the system 200 may perform (e.g., via one or more of the components described above) an artificial intelligence analysis, which includes an automated system (e.g., authentication server 210) connected to the central server library of data (e.g., program data 220 and/or memory 218) and configured to perform data extraction and data analysis in real time. For example, the system 200 may perform the artificial intelligence analysis in connection with the previously described artificial intelligence capture process (described above).

In some examples, the system 200 (e.g., one or more of the client devices 250, 252, and 254) can use gamma rays to determine one or more materials (e.g., to perform a material composition analysis) from which a creative work is formed. For example, the system may include gamma rays (e.g., included in, or used instead of, the image data described herein) that are transmitted to contact any object (e.g., creative work) or surface thereof (e.g., surface of a painting, or other substantially planar creative work) with a beam of gamma rays. In those examples, the system 200 can receive one or more reflected portions of the gamma rays transmitted to the object or surface and may determine, based on the received gamma rays, a chemical composition of the materials of that object or surface.

Figure 3:
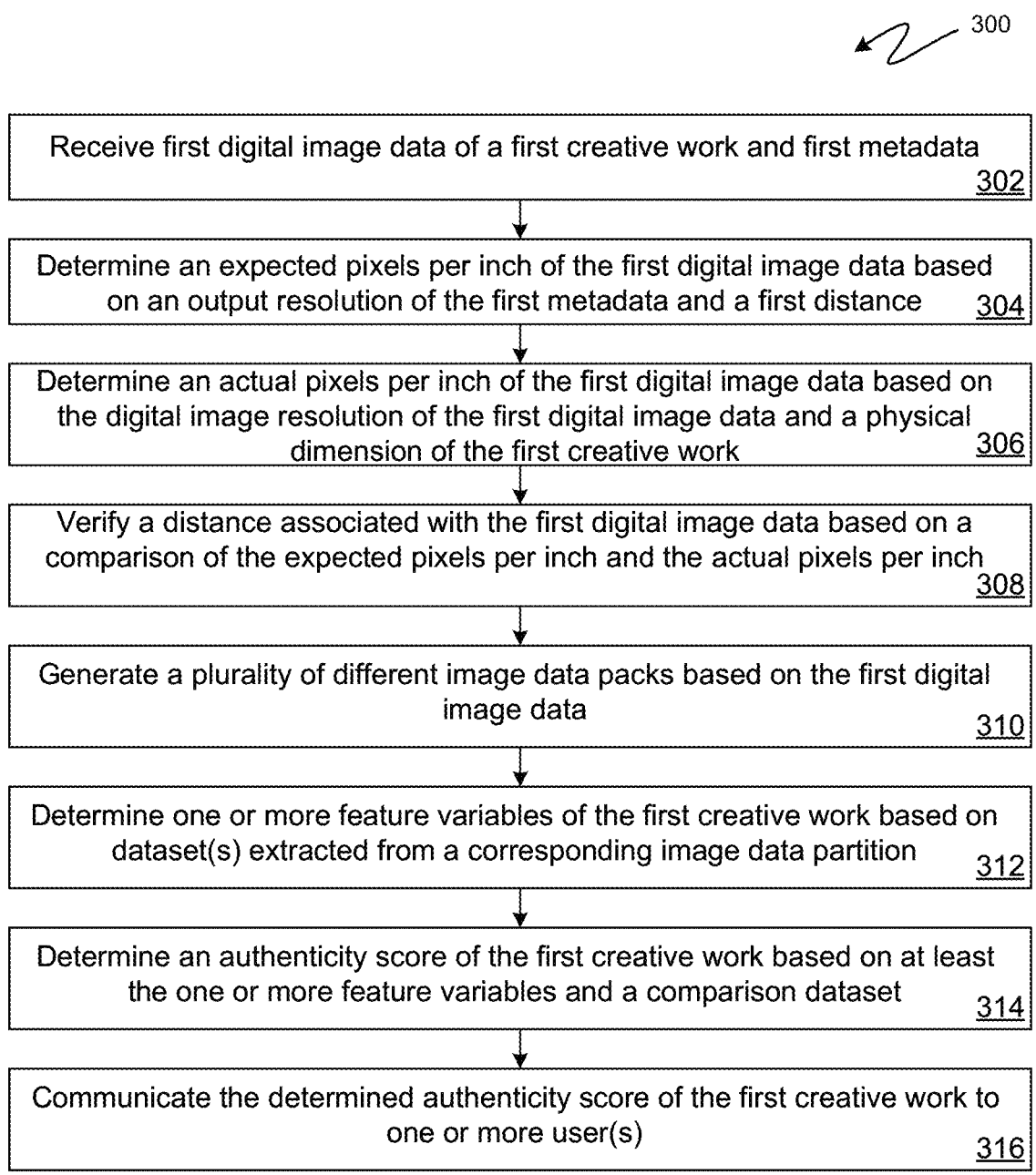
FIG. 3 is a flow diagram of a method of digital image data acquisition, according to one embodiment of the present disclosure.

FIG. 3 depicts an example method of method of digital image data acquisition for a creative work authenticity process, according to one embodiment of the present disclosure. The method 300 can be performed by at least one of the one or more processor(s) 212 of the authentication server 210 depicted in FIG. 2. However, in some embodiments, one or more of the steps may be performed by a different processor, server, or any other computing device (e.g., a processor of one or more client devices 250, 252, and 254 or one or more processors of another server system). For instance, one or more of the steps may be performed via a cloud-based service including any number of servers, which may be in communication (e.g., via network 201) with the client devices 250, 252, 254 or the Authentication Server 210.

At 302 the method 300 can receive first digital image data of a first creative work and first metadata (e.g., from a client device, including one or more of the client device 120 of FIGS. 1A and 1B or any of client devices 250, 252, or 254 of FIG. 2, or received via a network, including via the network 201 of FIG. 2, etc.). In some embodiments, the first digital image data and the first metadata received at step 302 may include one or more images of the first creative work at a first distance. In some embodiments, the first metadata can indicate an output resolution associated with the device used to collect the first digital image data (e.g., a number of megapixels for the digital images of the digital image data).

At 304 the method 300 can determine an expected pixels per inch of the first digital image data based on an output resolution of the first metadata and a first distance.

At 306 the method 300 can determine an actual pixels per inch of the first digital image data, (e.g., an actual pixels per inch of one or more digital images collected at the first distance) based on the digital image resolution of one or more digital images captured at the first distance of the first digital image data and a physical dimension of the first creative work. For example, at 306 the method may determine the actual pixels per inch using one or more of a width, a height, or any other physical dimensions for the creative work.

At 308 the method 300 can verify a distance associated with one or more digital images of the first digital image data based on a comparison of the expected pixels per inch and the actual pixels per inch. For example, the method may determine, at step 308, that a difference of the expected pixels per inch and the actual pixels per inch is less than a specified maximum difference.

At 310 the method 300 can generate a plurality of different image data packs based on the digital image data of the first creative work. For example, at step 310, the method 300 can generate a plurality of different image data packs that includes at least a color image data pack, a volumetric image data pack, and a calligraphic image data pack.

At 312 the method 300 can determine one or more feature variables of the first creative work and based on one or more dataset(s) extracted from a corresponding image data pack of the plurality of different image data packs. For example, at 312, the method 300 can generate one or more of different feature variables of the first creative work, which may include a combination of one or more of the feature variables described previously in greater detail (e.g., described with reference to the feature variable datasets 226 of FIG. 2).

At 314 the method 300 can determine an authenticity score of the first creative work based on at least the one or more feature variables determined for the first creative work and a comparison dataset based on a plurality of additional creative works. For example, at step 314, the method 300 may perform one or more of the operations described above for to the authentication engine 240 of FIG. 2.

At step 316, the method 300 can communicate (e.g., via a network) the determined authenticity score of the first creative work to one of more client devices, which may display the authenticity score to one or more users of the client devices.

Although the steps are shown in FIG. 3 having a particular order, it is intended that the steps may be performed in any order. It is also intended that some of these steps may be optional. The method 300 may be executed to determine an authenticity score of a creative work based on digital image data of the creative work and a comparison dataset based on a plurality of additional creative works.

Figure 4A:
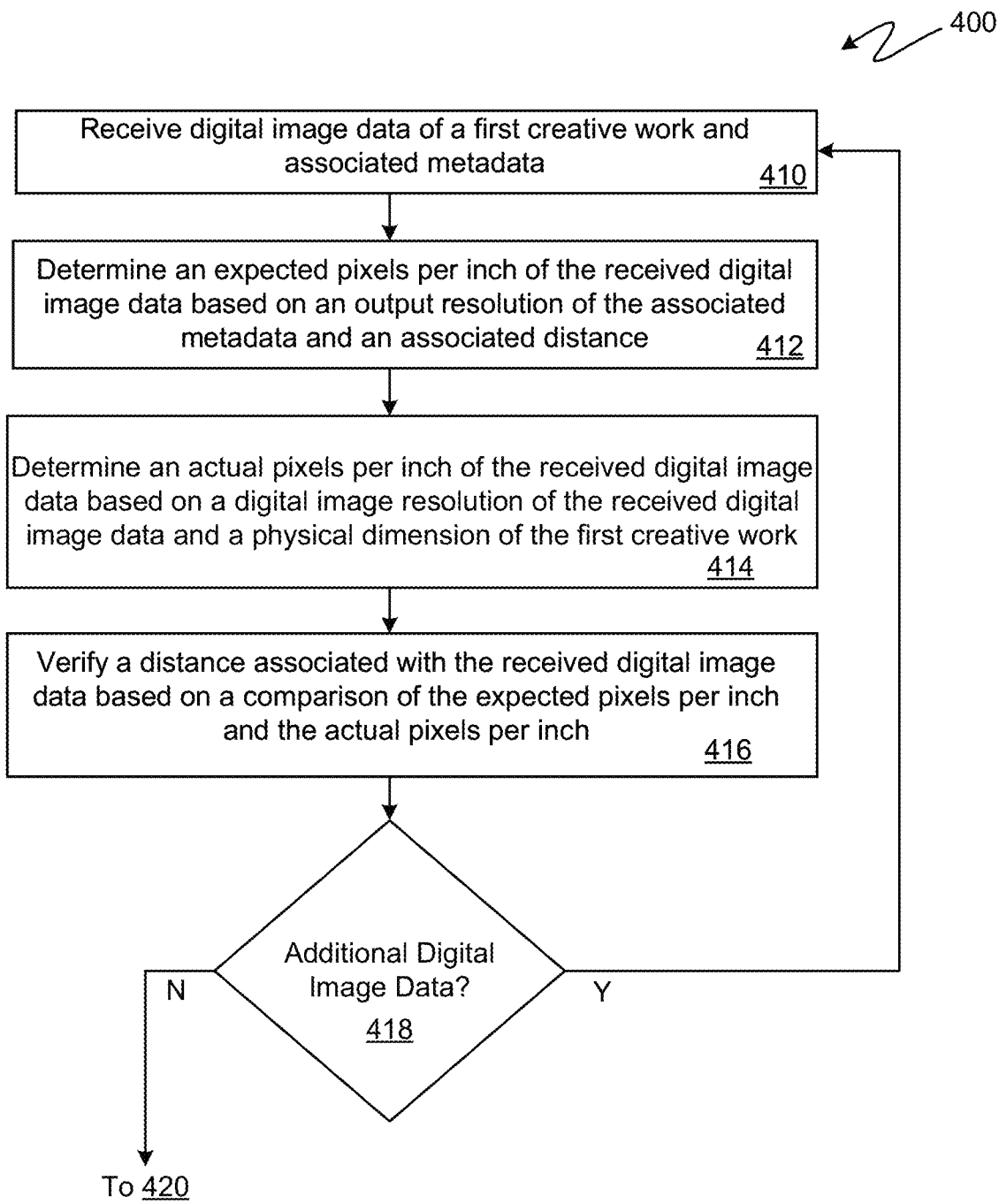
FIG. 4A is a flow diagram of a method to generate a creative work authenticity score, according to one embodiment of the present disclosure.

FIG. 4A is a flow diagram of a method to generate an authenticity score for a creative work using digital image data of the creative work and a comparison dataset, according to one embodiment of the present disclosure. The method 400 can be performed by at least one or more of the processor(s) of an authentication server (e.g., any, or all, of the one or more processors 212 of server 210, described above with reference to FIG. 2). However, in some embodiments, one or more of the steps may be performed by a different processor, server, or any other computing device(s), including, for example, one or more of the client devices 250, 252, and 254 of FIG. 2, a second authentication server (not shown in FIG. 2), one or more devices of a remote (e.g., cloud, remote, and/or third-party) computing system, and the like. For instance, in some embodiments, one or more of the steps of method 400 may be performed via a cloud-based service including any number of servers, which may be in communication with (e.g., via network 201), and may be configured identically to, the authentication server 210 and/ or one or more of the client devices 250, 252, and 254.

Although the steps are shown in FIG. 4A with a particular order, in some embodiments, the steps of method 400 may be performed in any order. It is also intended that some of the steps of method 400 may be optional. For example, in some embodiments of the methods according to the present disclosure may modify, replace, or omit entirely, one or more of the steps 412, 414, and 416. The method 400 may be executed (e.g., via one or more engine(s) and processor(s) of authentication server 210, as described above with reference to FIG. 2) to determine an authenticity of a creative work from digital image data of the creative work and a comparison dataset based on a plurality of additional creative works.

The method 400 can include repeating any of the operations at 410, 412, 414, 416, and 418 with each digital image data (and associated metadata) to be received as part of method 400, which may include any suitable number of repetitions, to receive any number of digital image data, as described herein. For example, the method 400 can repeat each of 410, 412, 414, and 416 with each digital image data (and associated metadata) to be received. In one embodiment, method 400 can repeat 410, 412, 414, and 416 for first digital image data, second digital image data, third digital image data, fourth digital image data, and so on, which may continue until all digital image data (and associated metadata) has been received.

At 410, the method 400 can receive digital image data of a first creative work and associated metadata (e.g., from a client device, including one or more of the client device 120 of FIGS. 1A and 1B or any of the client devices 250, 252, or 254 of FIG. 2, or received via a network, including via the network 201 of FIG. 2, etc.). For example, at 410 the method can receive second digital image data and associated metadata (e.g., second associated metadata), which may be after determining, at 418, to receive additional digital image data by repeating method 400 at step 410 (e.g., to receive the second digital image data) In some embodiments, the received digital image data and the associated metadata, which may are received at 410, may include one or more images of the first creative work at a first distance. In some embodiments, the associated metadata can indicate an output resolution associated with the device used to collect the received digital image data (e.g., a number of megapixels for the digital images of the received digital image data).

At 412, the method 400 can determine an expected pixels per inch of the received digital image data based on an output resolution of the associated metadata (e.g., for the received digital image data) and an associated distance. In some examples, the associated distance may be any of a first, second, third, or fourth distance, which may each correspond to a first, second, third, or fourth digital image data, respectively.

At 414, the method 400 can determine an actual pixels per inch of the received digital image data, (e.g., an actual pixels per inch of one or more digital images collected at the associated distance) based on the digital image resolution of one or more digital images captured at the associated distance of the received digital image data and a physical dimension of the first creative work. For example, at 414 the method 400 may determine the actual pixels per inch of the received digital image data using one or more of a width, a height, or any other physical dimension of the creative work or a portion thereof.

At 416, the method 400 can verify a distance associated with one or more digital images of the received digital image data (e.g., of the digital image data received for that repetition of 410, 412, 414, and 416) based on a comparison of the expected pixels per inch (e.g., as determined at 412) and the actual pixels per inch (e.g., determined at 414). For example, the method 400 may determine, at step 416, that a difference of the expected pixels per inch and the actual pixels per inch is less than a specified maximum difference and, as a result, verify the distance associated with the received digital image data (or one or more digital images of the received digital image data) substantially matches an associated distance or expected distance associated with that received digital image data.

In some embodiments, method 400 includes receiving (e.g., via a communications network), a second digital image data and associated metadata or second metadata (e.g., at 410 and in response to determining, at 418, that additional digital image data will be received). For example, the second digital image data can capture the first creative work at a second distance and with an output resolution associated with the second digital image data. Additionally, the received second associated metadata (or associated metadata of the second digital image data) can include a file identifier that indicates an originality of the received second digital image data. For example, the file indicator of the second associated metadata can indicate that the second digital image data does not reflect, or contain, image data that was changed with, or output by, the operation of an electronic image editor (e.g., image editing software).

Some examples of method 400 further include receiving, via the communications network, a third digital image data and a third metadata or associated metadata of the third digital image data (e.g., at 410 and in response to determining, at 418, that additional digital image data will be received). The third digital image data can capture the first creative work at a third distance, which may differ from the first and second distances (e.g., at a smaller distance from, or closer to, the first creative work). And, in some instances, the received third metadata includes an output resolution associated with the third digital image data (e.g., an imaging resolution of the device used to capture the third digital image data) and a file identifier indicative of an originality of the third digital image data For example, the file indicator of the second digital image data can indicate that the second digital image data does not reflect, or contain, image data that was changed with, or output by, the operation of electronic image editing of any kind (e.g., image editing software).

In still other examples, method 400 can receive, via the communications network, a fourth digital image data and a fourth associated metadata (e.g., at 410 and in response to determining, at 418, that additional digital image data will be received), which may capture the first creative work at a fourth distance. The fourth associated metadata can include an output resolution associated with the fourth digital image data and a file identifier indicative of an originality of the fourth digital image data. And, in some examples, the method 400 can generate, based on the first, second, third, and fourth digital image data, a plurality of separate image datasets and determine one or more feature variables of the creative work to be authenticated. In some examples, the received fourth digital image data can comprise digital image data capturing a back, or rear, side of the first creative work (e.g., a portion of the surface of the creative work, which is opposite a front, or painted, surface of the creative work).

Figure 4B:
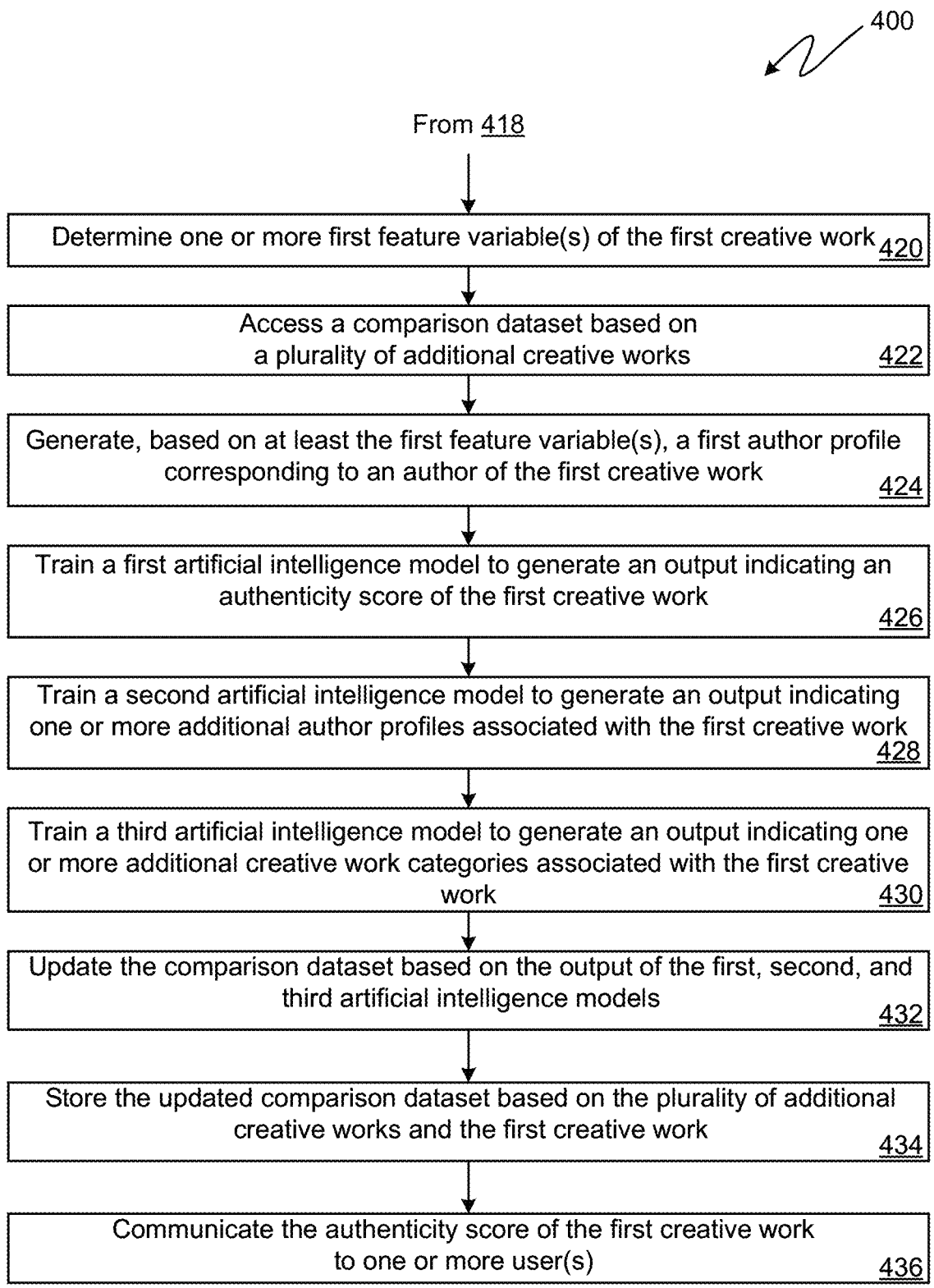
FIG. 4B is a flow diagram of a method to generate a creative work authenticity score, according to one embodiment of the present disclosure.

FIG. 4B is a flow diagram of a method to generate an authenticity score for a creative work using digital image data of the creative work and a comparison dataset, according to one embodiment of the present disclosure. The method 400 can be performed by at least one or more of the processor(s) of an authentication server (e.g., any, or all, of the one or more processors 212 of server 210, described above with reference to FIG. 2). However, in some embodiments, one or more of the steps may be performed by a different processor, server, or any other computing device(s), including, for example, one or more of the client devices 250, 252, and 254 of FIG. 2, a second authentication server (not shown in FIG. 2), one or more devices of a remote (e.g., cloud, remote, and/or third-party) computing system, and the like. For instance, in some embodiments, one or more of the steps of method 400 may be performed via a cloud-based service including any number of servers, which may be in communication with (e.g., via network 201), and may be configured identically to, the authentication server 210 and/or one or more of the client devices 250, 252, and 254.

Although the steps are shown in FIG. 4 with a particular order, in some embodiments, the steps of method 400 may be performed in any order. It is also intended that some of the steps of method 400 may be optional. For example, in some embodiments of the methods according to the present disclosure may modify, replace, or omit entirely, one or more of the steps 408, 412, 414, and 416. The method 400 may be executed (e.g., via one or more engine(s) and processor(s) of authentication server 210, as described above with reference to FIG. 2) to determine an authenticity of a creative work from digital image data of the creative work and a comparison dataset based on a plurality of additional creative works.

As described above, with reference to FIG. 4A, at steps 410-418, the method 400 can receive digital image data of a first creative work. For example, step 410 may include receiving first digital image data of the first creative work according to one or more of the operations of the authentication server 210 and the image data processors 232, which are described in greater detail above with reference to FIG. 2.

At step 422, the method 400 can determine one or more feature variables of the first creative work. For example, the method can determine a combination of one or more of the different feature variables described with reference to feature variable datasets 226 of FIG. 2. In some examples, at 422 the method 400 can determine the one or more feature variables of the first creative work based one or more different digital image data received during one or more repetitions of the portion of method 400 shown in FIG. 4A and described above. For example, at 422 the method 400 may, in one example, determine a plurality of feature variables of the first creative work based on first, second, third, and fourth digital image data of the first creative work, which were each received at respective iterations of 410 of the method 400.

At step 424, the method 400 can access a comparison dataset, or one or more set(s) of comparison data, which may include a plurality of feature variable datasets, including a feature variable dataset corresponding to the each of the plurality of additional creative works. For example, the one or more sets of comparison data (e.g., the comparison dataset) may comprise a plurality of digital image files of the first creative work, each image file of the plurality of image files comprising image data of the first creative work. In some examples, the one or more sets of comparison data can include one or more digital images of additional creative works, which share one or more of the feature variables generated for the first creative work (e.g., that are associated with feature variables substantially similar to those generated for the first creative work at 424 of method 400).

In still other examples, method 400 includes partitioning, by the one or more processors and using two or more subsets, each of the following: one more feature variables of the first creative work, the plurality of different image data packs (e.g., as described above with reference to FIG. 3), the one or more datasets extracted from an image data pack (e.g., as described above with reference to FIG. 4A), and the received digital image data (e.g., all digital image data received for the first creative work). More specifically, in some of those examples, method 400 may determine an external consistency metric of the two or more subsets based on a comparison of one or more portions of two or more corresponding datasets in each of the different subsets. And, in some of those same examples, the method 400 can determine an internal a consistency metric for a single subset (e.g., of the two subsets) based on a comparison of one or more portions of data within the same subset; and determine, based on a comparison of the external consistency metric and the internal consistency metric, a confidence score for one or more datasets associated with the digital image data of the first creative work. For example, the method 400 can include determining the confidence score for one or more datasets for a specific author associated with the first creative work (e.g., to authenticate the first creative work based on data associated with that specific author).

In some examples, the method 400 can, at 430, determine a first artistic style associated with the first creative work, receive a plurality of characteristics of one or more creative works by a second author and wherein the one or more creative works by the second author are associated with the first artistic style. Additionally, some examples of method 400 generate an author profile for the second author based on the received plurality of characteristics of one or more creative works by the second author to determine the authenticity score for the first creative work (e.g., at 426) based on at least the determined one or more characteristics of the first creative work, the author profile for the first author, the author profile for the second author, and the received one or more sets of comparison data.

At step 424, the method 400 can generate, based on at least the first feature variable(s) of the first creative work, a first author profile of an author of the first creative work. For example, step 424 can include generating an author profile according to the description provided with regard to the author profiles 227 of Authentication Sever 210, described above in greater detail with reference to FIG. 2.

At step 426, the method 400 can train a first artificial intelligence model to generate an output indicating an authenticity score of the first creative work. For example, step 410 can include training an artificial intelligence model, with input including the feature variables of the first creative work and a comparison dataset, to generate an output indicating an authenticity score, or otherwise authenticate, the first creative work. For example, the method 400 may train the first artificial intelligence model to output an authenticity of the first creative work (e.g., at 426) according to the operations of the authenticity engine 240, which is described above with reference to FIG. 2.

At step 428, the method 400 can train a second artificial intelligence model to generate an output indicating one or more author profiles that are associated with one or more of the first author and the first creative work. For example, the second artificial intelligence model may be trained to generate an output based on the feature variables generated for the first creative work and the one or more sets of comparison data accessed at 420.

At step 430, the method 400 can train a third artificial intelligence model to generate an output indicating one or more additional creative work categories associated with the first creative work or with an author of the first creative work. For example, the second artificial intelligence model may be trained to generate an output based on the feature variables generated for the first creative work and the one or more sets of comparison data accessed at 422

At step 432, the method 400 can update the comparison dataset based on the output of the first, second, and third artificial intelligence models. For example, the method 400 may update the one more sets of comparison data accessed at 422 based on the outputs generated by the artificial intelligence model(s) trained at each of 426, 428, and 430.

At step 434, the method 400 can store the updated comparison dataset, or updated one or more sets of comparison data, based on both a plurality of additional creative works (e.g., the plurality of additional creative works associated with the one or more sets of comparison data accessed at 422) and the first creative work.

At step 436, the method 400 can communicate, via a network, the authenticity of the first creative work (e.g., an authenticity estimation, authenticity score, or other authenticity result) to one or more users or client devices. For example, step 436 may include communicating an authenticity score of the first creative work as described above with reference to the operation of server 210 after generating an authenticity score via one or more artificial intelligence models of the authenticity engine 240, as described in greater detail above with reference to FIG. 2.

Figure 5:
FIG. 5 depicts an example of a brushstroke feature of a creative work and captured in image data of the creative work, according to one embodiment of the present disclosure.
Figure 5:

FIG. 5 depicts an example of a brushstroke extraction dataset 510 of an entire creative work and another brushstroke extraction dataset 512 of a detailed, or zoomed in, portion of the creative work, which may each be extracted from the image data of a creative work or from a volumetric image data pack, in accordance with present implementations.

Figure 6:
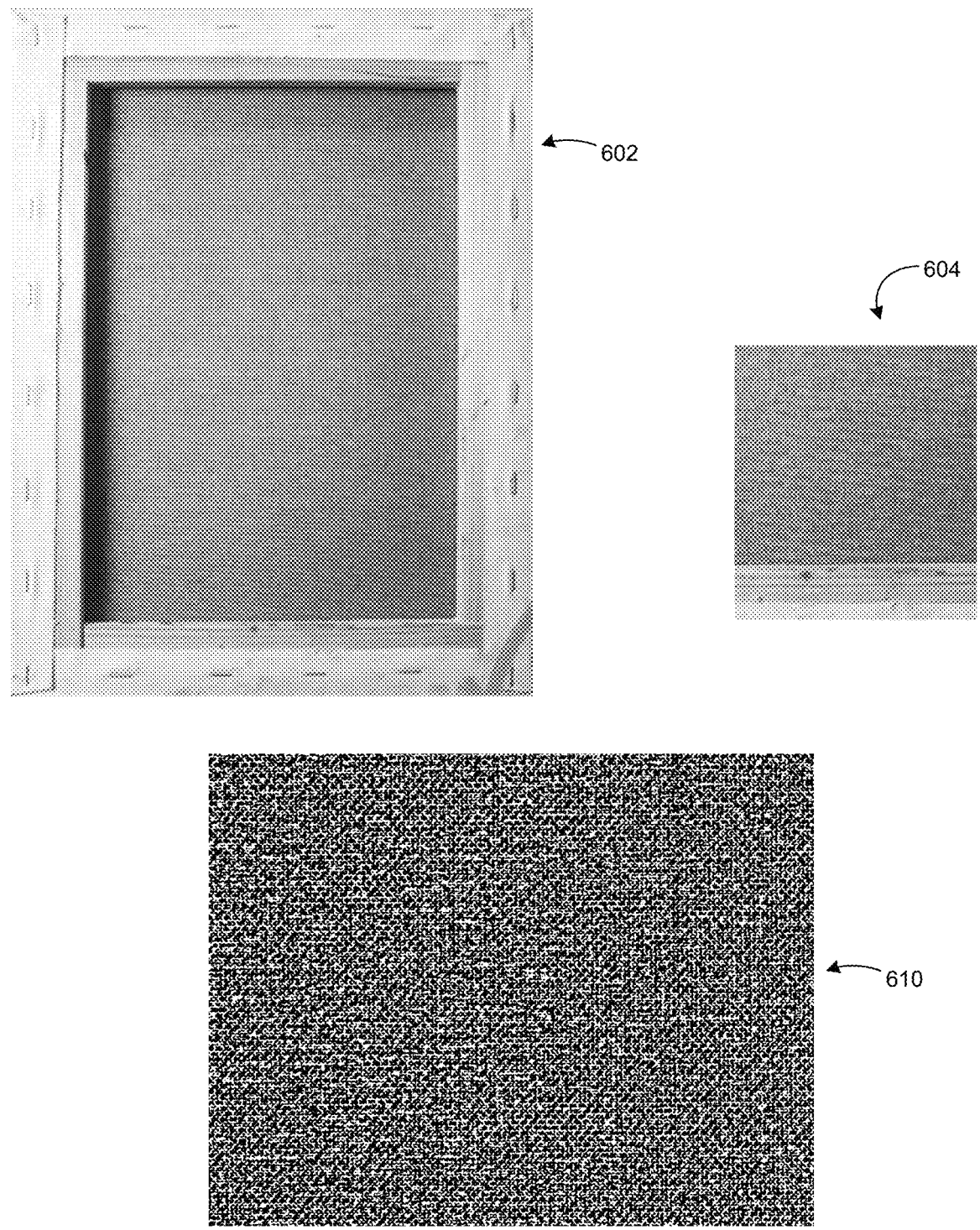
FIG. 6 depicts an example of a canvas feature of a creative work that is captured in image data of the creative work, according to one embodiment of the present disclosure.

FIG. 6 depicts an example of a canvas extraction dataset 610, which may be extracted from the digital image data for the backward surface of a creative work, such as a digital image 602 of a creative work's entire backward surface and digital image 604 of a portion, or detail, of the backward surface of a creative work, in accordance with present implementations.

Figure 7:
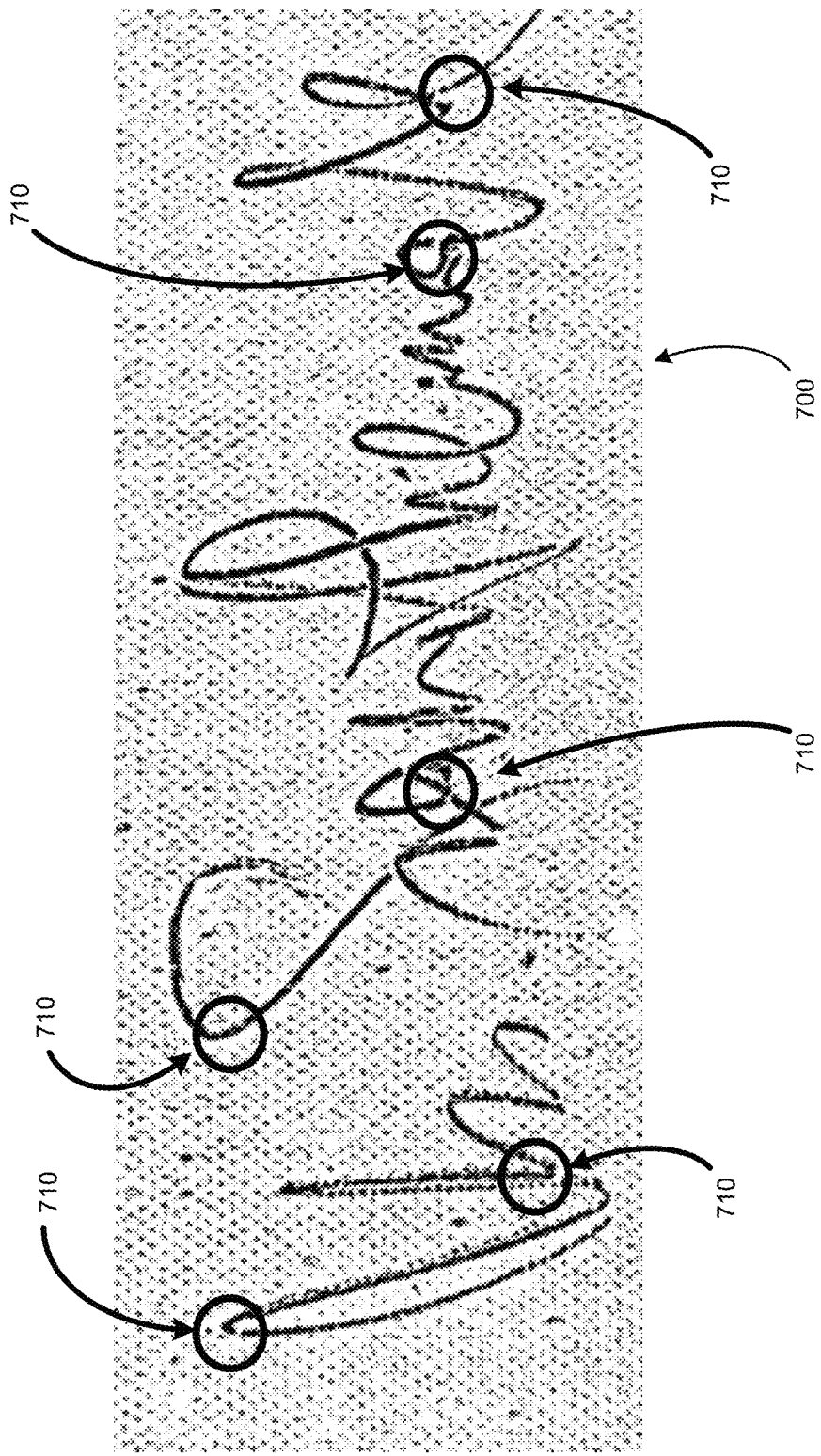
FIG. 7 depicts an example of a calligraphy feature of a creative work that is captured in image data of the creative work, according to one embodiment of the present disclosure.

FIG. 7 depicts an example of a calligraphy extraction dataset 700, which may be extracted from the image data of a creative work and from a calligraphic image dataset generated from the image data, in accordance with present implementations. The calligraphy extraction dataset 700 may include a plurality of calligraphic features 710, which include digital image data associated with several different regions within the calligraphy extraction dataset 700.

Some embodiments of the present disclosure can include a method for determining an authenticity score for a creative work. In some embodiments the method can include capturing, by a digital imaging device, a first digital image file of a first creative work. In some embodiments, the first digital image file comprises first digital image data collected at a first distance and first metadata comprising an output resolution of the digital imaging device and a file identifier indicative of an originality of the digital image data. The method can include determining, by the one or more processors, an expected pixels per inch of the first digital image data based on the output resolution of the first metadata and the first distance. The method can include determining, by the one or more processors, an actual pixels per inch of the first digital image data based on a digital image resolution of the first digital image data and a dimension of the first creative work. Additionally, the method may include verifying, by the one or more processors, the first distance of the first digital image file by determining that a difference between the expected pixels per inch for the first digital image data and the actual pixels per inch of the first digital image data is below a threshold.

The method can include generating, by the one or more processors and based on the first digital image data, a plurality of separate image packs comprising a color data image pack, a volumetric data image pack, and a calligraphic data image pack. The method can also include extracting, by the one or more processors and from one or more of the plurality of separate image packs, a plurality of extraction datasets of the first creative work. The method can also include determining one or more feature variables of the creative work based on the plurality of extraction datasets and receiving one or more sets of comparison data comprising additional image data associated with the first creative work. Additionally, the method may include determining an authenticity score for the first creative work based on at least the determined one or more characteristics of the first creative work and the received comparison data and indicating a probability for the authenticity of the first creative work based on a determination that the authenticity score for the first creative work is greater than a threshold.

Additionally, some embodiments of the method can include capturing, by the digital imaging device, a second digital image file for the first creative work at a second distance, wherein the second digital image file comprises second digital image data and second metadata comprising an output resolution of the digital imaging device and a file identifier indicative of an originality of the second digital image data. The method can include capturing, by the digital imaging device, a third digital image file for the first creative work at a third distance, and wherein the third digital image file comprises third digital image data and third metadata comprising an output resolution of the digital imaging device and a file identifier indicative of an originality of the third digital image data. And the method can include generating, by the one or more processors and based on the digital image data of the first, second, and third digital image files, the plurality of separate image datasets.

Additionally, some embodiments of the method can further include capturing, by the digital imaging device, a fourth digital image file for the first creative work at a fourth distance, wherein the fourth digital image file comprises fourth digital image data and fourth metadata comprising an output resolution of the digital imaging device and a file identifier indicative of an originality of the fourth digital image data. And the method can include generating, by the one or more processors and based on the digital image data of the first, second, third, and fourth digital image files, the plurality of separate image datasets. the calligraphy extraction dataset.

Having now described some illustrative implementations, the foregoing is illustrative and not limiting, having been presented by way of example. In particular, although many of the examples presented herein involve specific combinations of method acts or system elements, those acts and those elements may be combined in other was to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both "A' and 'B'. Such references used in conjunction with "comprising" or other open terminology can include additional items. References to "is" or "are" may be construed as nonlimiting to the implementation or action referenced in connection with that term. The terms "is" or "are" or any tense or derivative thereof, are interchangeable and synonymous with "can be" as used herein, unless stated otherwise herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Scope of the systems and methods described herein is thus indicated by the appended claims, rather than the foregoing description. The scope of the claims includes equivalents to the meaning and scope of the appended claims.

What is claimed is:

1. A system to determine an authenticity score for a creative work, the system comprising:
one or more processors and memory having instructions stored thereon to be executed by the one or more processors to cause the system to perform operations to:
receive, via a network, first digital image data of a first creative work and first metadata, the first digital image data collected at a first distance and comprising a digital image of the entire first creative work, and the first metadata including an output resolution and one or more originality identifiers indicative of an originality of the first digital image data;
determine an expected pixels per inch of the first digital image data collected at the first distance based on the output resolution of the first metadata and an expected first distance;
determine an actual pixels per inch of the first digital image data collected at the first distance based on the output resolution and a physical dimension of the first creative work;

verify the first distance based on a comparison of the expected pixels per inch and the actual pixels per inch of the first digital image data collected at the first distance;

generate, based on the first digital image data, a plurality of different image data packs;

determine one or more feature variables of the first creative work based on one or more datasets extracted from one or more digital images of an image data pack, each of the one or more determined feature variables corresponding to a characteristic of the first creative work;

determine an authenticity score for the first creative work based on at least a comparison of the one or more feature variables determined for the first creative work and a comparison dataset based on a plurality of additional creative works; and communicate, via the network, the determined authenticity score to a client device.

2. The system of claim 1, wherein the instructions to be executed by the one or more processors cause the system to:

receive, via the network, a second digital image data and a second metadata,
  wherein the second digital image data comprises digital image data of the first creative work at a second distance and
  wherein the second metadata comprises an output resolution and one or more originality identifiers indicative of an originality of the second digital image data;

receive, via the network, a third digital image data and a third metadata,
  wherein the third digital image data comprises digital image data of the first creative work at a third distance and
  wherein the third metadata comprises an output resolution and one or more originality identifiers indicative of an originality of the third digital image data; and
  wherein the processors are further configured to generate the plurality of different image data packs based on the first digital image data, the second digital image data, and the third image data.

3. The system of claim 1, wherein the instructions to be executed by the one or more processors cause the system to:

receive, via the network, a fourth digital image data and a fourth metadata,
  wherein the fourth digital image data comprises one or more digital images of the backside of the first creative work, including two or more digital images of the entire backside of the first creative work and
  wherein the fourth metadata comprises an output resolution and one or more originality identifiers indicative of an originality of the fourth digital image data; and
  wherein the processors are further configured to generate the plurality of different image data packs based on the first digital image data, the second digital image data, the third digital image data and the fourth digital image data.

4. The system of claim 3, wherein the fourth digital image data comprises digital image data for less than the entire backside of the first creative work and digital image data of an author signature.

5. The system of claim 1, wherein the comparison dataset further comprises a plurality of feature variable datasets and a plurality of digital image datasets for each additional creative work of the plurality of additional creative works of the comparison dataset.

6. The system of claim 1, wherein the instructions to be executed by the one or more processors cause the system to:

partition, into two or more subsets, each of the following: one more feature variables of the first creative work, the plurality of different image data packs, the one or more datasets extracted from an image data pack, and the first digital image data;

determine an external consistency metric of the two or more subsets based on a comparison of one or more portions of two or more corresponding datasets in each of the different subsets;

determine an internal a consistency metric for a single subset based on a comparison of one or more portions of data within the same subset; and determine, based on a comparison of the external consistency metric and the internal consistency metric, a confidence score for one or more datasets associated with the digital image data of the first creative work.

7. The system of claim 1, wherein the instructions to be executed by the one or more processors cause the system to:

generate an author profile for a first author of the first creative work, the author profile comprising one or more additional creative works of the author, one or more profiles of one or more associated authors, one or more time periods, one or more geographic locations, and one or more creative work categories associated with the author; and determine the authenticity score for the first creative work based on at least based on a comparison of the one or more feature variables determined for the first creative work, the author profile of the first author, and the comparison dataset based on a plurality of additional creative works.

8. The system of claim 6, wherein the instructions to be executed by the one or more processors cause the system to:

determine a first creative work category associated with the first creative work;

identify a one or more creative works associated with the first creative work category;

generate an author profile of a second author based on the received plurality of characteristics of one or more creative works by the second author; and wherein determining the authenticity score for the first creative work is based on at least the determined one or more characteristics of the first creative work, the author profile for the first author, the author profile for the second author, and the received one or more sets of comparison data.

9. The system of claim 1, wherein one of the one or more feature variables of the first creative work comprises a brush sign frequency map on a subject of the first creative work.

10. The system of claim 1, wherein one of the one or more feature variables of the first creative work comprises a pigment density of the first creative work.

11. A method of determining a creative work authenticity score, the method comprising:

receiving, via a communications network, first digital image data and first metadata, wherein the first digital image data comprises a capture of a first creative work at a first distance and wherein the first metadata comprises an output resolution associated with the first digital image data and an originality identifier indicative of an originality of the first digital image data;

determining, by one or more processors, an expected pixels per inch of the first digital image data based on the output resolution of the first metadata and the first distance;

determining, by the one or more processors, an actual pixels per inch of the digital image data based on a digital image resolution of the first digital image data and a dimension of the first creative work;

verifying, by the one or more processors, the first distance of the first digital image data based on a difference between the expected pixels per inch for the first digital image data and the actual pixels per inch;

generating, by the one or more processors and based on the first digital image data, a plurality of different image data packs;

determining one or more feature variables of the first creative work based on one or more datasets extracted from a corresponding image data pack of the plurality of image data packs, each of the one or more feature variables corresponding to a characteristic of the first creative work;

determining an authenticity score for the first creative work based on at least a comparison of the one or more feature variables of the first creative work and a comparison dataset based on a plurality of separate creative works; and displaying, at a client device, the determined authenticity score of the first creative work.

12. The method of claim 11, further comprising:
receiving, via the communications network, a second digital image data and a second metadata,
wherein the second digital image data captures the first creative work at a second distance and
wherein the second metadata comprises an output resolution associated with the second digital image data and a file identifier indicative of an originality of the second digital image data;
receiving, via the communications network, a third digital image data and a third metadata,
wherein the third digital image data captures the first creative work at a third distance and
wherein the third metadata comprises an output resolution associated with the third digital image data and a file identifier indicative of an originality of the third digital image data; and
generating, by the one or more processors and based on the first, second, and third digital image data, the plurality of separate image datasets.

13. The method of claim 12, further comprising:
receiving, via the communications network, a fourth digital image data and a fourth metadata,
wherein the fourth digital image data captures the first creative work at a fourth distance and
wherein the fourth metadata comprises an output resolution associated with the fourth digital image data and a file identifier indicative of an originality of the fourth digital image data;
generating, by the one or more processors and based on the first, second, third, and fourth digital image data, the plurality of separate image datasets.

14. The method of claim 13, wherein the fourth digital image data comprises digital image data of a back of the first creative work.

15. The method of claim 11, wherein the one or more sets of comparison data comprises a plurality of digital image files of the first creative work, each image file of the plurality of image files comprising image data of the first creative work.

16. The method of claim 11, further comprising:
partitioning, by the one or more processors and using two or more subsets, each of the following: one more feature variables of the first creative work, the plurality of different image data packs, the one or more datasets extracted from an image data pack, and the first digital image data;
determining, by the one or more processors, an external consistency metric of the two or more subsets based on a comparison of one or more portions of two or more corresponding datasets in each of the different subsets;
determining, by the one or more processors, an internal a consistency metric for a single subset based on a comparison of one or more portions of data within the same subset; and
determining, by the one or more processors, based on a comparison of the external consistency metric and the internal consistency metric, a confidence score for one or more datasets associated with the digital image data of the first creative work.

17. The method of claim 11, further comprising:
generating an author profile for a first author of the first creative work based on a plurality of characteristics of one or more creative works by the first author, wherein the author profile for the first author comprises a period of time and one or more geographic locations associated with the first author; and
wherein determining the authenticity score for the first creative work is based on at least the determined one or more characteristics of the first creative work, the author profile for the first author, and the received one or more sets of comparison data.

18. The method of claim 17, further comprising:
determining a first artistic style associated with the first creative work;
receiving a plurality of characteristics of one or more creative works by a second author and wherein the one or more creative works by the second author are associated with the first artistic style;
generating an author profile for the second author based on the received plurality of characteristics of one or more creative works by the second author; and
wherein determining the authenticity score for the first creative work is based on at least the determined one or more characteristics of the first creative work, the author profile for the first author, the author profile for the second author, and the received one or more sets of comparison data.

19. The method of claim 11, wherein the one or more determined characteristics of the first creative work comprise a brush sign frequency map of a subject in the first creative work.

20. The method of claim 11, wherein the one or more determined characteristics of the first creative work comprise a pigment density of a portion of the first creative work.

21. A system, comprising:
one or more processors coupled to non-transitory memory, the one or more processors configured to:
receive, from a remote client device, first digital image data of a first creative work, the first digital image data comprising a plurality of images of the first creative work;

determine, based on the first digital image data, one or more first feature variables, each of the first feature variables corresponding to a characteristic of the first creative work;

access a comparison dataset based on digital image data of a plurality of additional creative works, the comparison dataset comprising, for each of the additional creative works:
one or more associated author profiles,
one or more associated creative work categories, and
one or more corresponding feature variables;

generate, based on at least the one or more first feature variables, a first author profile corresponding to an author of the first creative work;

train, with input including the one or more first feature variables and the comparison dataset, a first machine learning model to generate an output indicating an authenticity score of the first creative work;

train, with input including the one or more first feature variables and the comparison dataset, a second machine learning model to generate an output indicating one or more additional author profiles associated with the first creative work;

train, with input including the one or more first feature variables and the comparison dataset, a third machine learning model to generate an output indicating one or more creative work categories associated with the first creative work;

update, based on the output of the first machine learning model indicating an authenticity score of the first creative work, the comparison dataset to further comprise the one or more first feature variables and the first author profile;

update, based on the output of the second machine learning model indicating one or more revised author profiles associated with the first creative work, the comparison dataset to comprise one or more additional author profiles associated with, or corresponding to, the first author profile;

update, based on the output of the third machine learning model indicating one or more creative work categories associated with the first creative work, the comparison dataset to comprise one or more revised creative work categories;

store, in the non-transitory memory of the one or more processors, the updated comparison dataset; and communicate, to the remote client device, the output of the first machine learning model indicating an authenticity score of the first creative work.

22. A method of determining an authenticity score based on digital image data of a creative work, the method comprising:

receiving, via a network, a first digital image data of a first creative work, the first digital image data comprising a plurality of images of the first creative work;

determining, by one or more processors and based on the first digital image data, one or more first feature variables, each of the first feature variables corresponding to a characteristic of the first creative work;

generating, by the one or more processors and based on at least the one or more first feature variables, a first author profile corresponding to an author of the first creative work;

obtaining, by the one or more processors, a comparison dataset that comprises, for each one of a plurality of additional creative works:
one or more associated author profiles,
one or more associated creative work categories, and
one or more associated feature variables;

training, by the one or more processors and with input including the first feature variables and the comparison dataset, a first machine learning model to generate an output indicating an authenticity score of a creative work corresponding to the first feature variables;

training, by the one or more processors and with input including the first feature variables and the comparison dataset, a second machine learning model to generate an output indicating one or more associated author profiles corresponding to the first feature variables of the first creative work;

training, by the one or more processors and with input including the one or more first feature variables and the comparison dataset, a third machine learning model to generate an output indicating one or more creative work categories associated with the first creative work;

updating, by the one or more processors and based on the output of the first machine learning model indicating an authenticity score of the first creative work, the comparison dataset to further comprise the one or more first feature variables and the first author profile;

updating, by the one or more processors and based on the output of the second machine learning model indicating one or more revised author profiles associated with the first creative work, the comparison dataset to comprise one or more additional author profiles associated with, or corresponding to, the first author profile;

updating, by the one or more processors and based on the output of the third machine learning model indicating one or more creative work categories associated with the first creative work, the comparison dataset to comprise one or more revised creative work categories;

storing, with a non-transitory memory and by the one or more processors, the updated comparison dataset; and communicating, via the network, an output of the first machine learning model indicating an authenticity score of the first creative work corresponding to the first feature variables.

* * * * *